(12) United States Patent
Quinn

(10) Patent No.: US 12,621,400 B2
(45) Date of Patent: May 5, 2026

(54) SELF-VERIFYING HIDDEN DIGITAL MEDIA WITHIN OTHER DIGITAL MEDIA

(71) Applicant: Cary Michael Quinn, Tampa, FL (US)

(72) Inventor: Cary Michael Quinn, Tampa, FL (US)

( * ) Notice: Subject to any disclaimer, the term of this patent is extended or adjusted under 35 U.S.C. 154(b) by 83 days.

(21) Appl. No.: 18/557,206

(22) PCT Filed: May 10, 2022

(86) PCT No.: PCT/US2022/028557
§ 371 (c)(1),
(2) Date: Oct. 25, 2023

(87) PCT Pub. No.: WO2022/245595
PCT Pub. Date: Nov. 24, 2022

(65) Prior Publication Data
US 2024/0223711 A1      Jul. 4, 2024

Related U.S. Application Data

(60) Provisional application No. 63/189,770, filed on May 18, 2021.

(51) Int. Cl.
*H04N 1/04*          (2006.01)
*G06F 3/04845*          (2022.01)
*H04N 1/44*          (2006.01)

(52) U.S. Cl.
CPC ....... *H04N 1/4446* (2013.01); *G06F 3/04845* (2013.01)

(58) Field of Classification Search
USPC ....................................................... 358/3.28
See application file for complete search history.

(56) References Cited

U.S. PATENT DOCUMENTS

| | | | | |
|---|---|---|---|---|
| 2006/0280331 A1* | 12/2006 | Chosson | .............. | G07D 7/0032 |
| | | | | 382/100 |
| 2011/0123125 A1* | 5/2011 | Alasia | .................... | H04N 1/448 |
| | | | | 382/232 |
| 2015/0371613 A1* | 12/2015 | Patel | ...................... | G09G 5/395 |
| | | | | 345/549 |

OTHER PUBLICATIONS

International Search Report from PCT/US2022/028557, dated Aug. 2, 2022 (1 page).
Written Opinion of the International Searching Authority from PCT/US2022/028557, dated Aug. 2, 2022 (4 pages).

* cited by examiner

*Primary Examiner* — Cheukfan Lee
(74) *Attorney, Agent, or Firm* — Fitch, Even, Tabin & Flannery, LLP

(57)          ABSTRACT

Self-verifying hidden digital media using a novel interactive component that reveals a secondary hidden watermark. One method reveals at least one hidden image into a visible image, may include the steps of generating, via a processor, a first image that is visible on a computing device screen; generating, via a processor, at least one second image, the at least one second image being in an invisible or nearly invisible state to the human eye in a neutral state and visible in a user activated state. In one embodiment, the activated state of the computing device is achieved when the computing device screen is zoomed in or out, pointer scrolled in a predetermined way, or when the first image has its window size changed.

5 Claims, 20 Drawing Sheets

1006             1102             1002

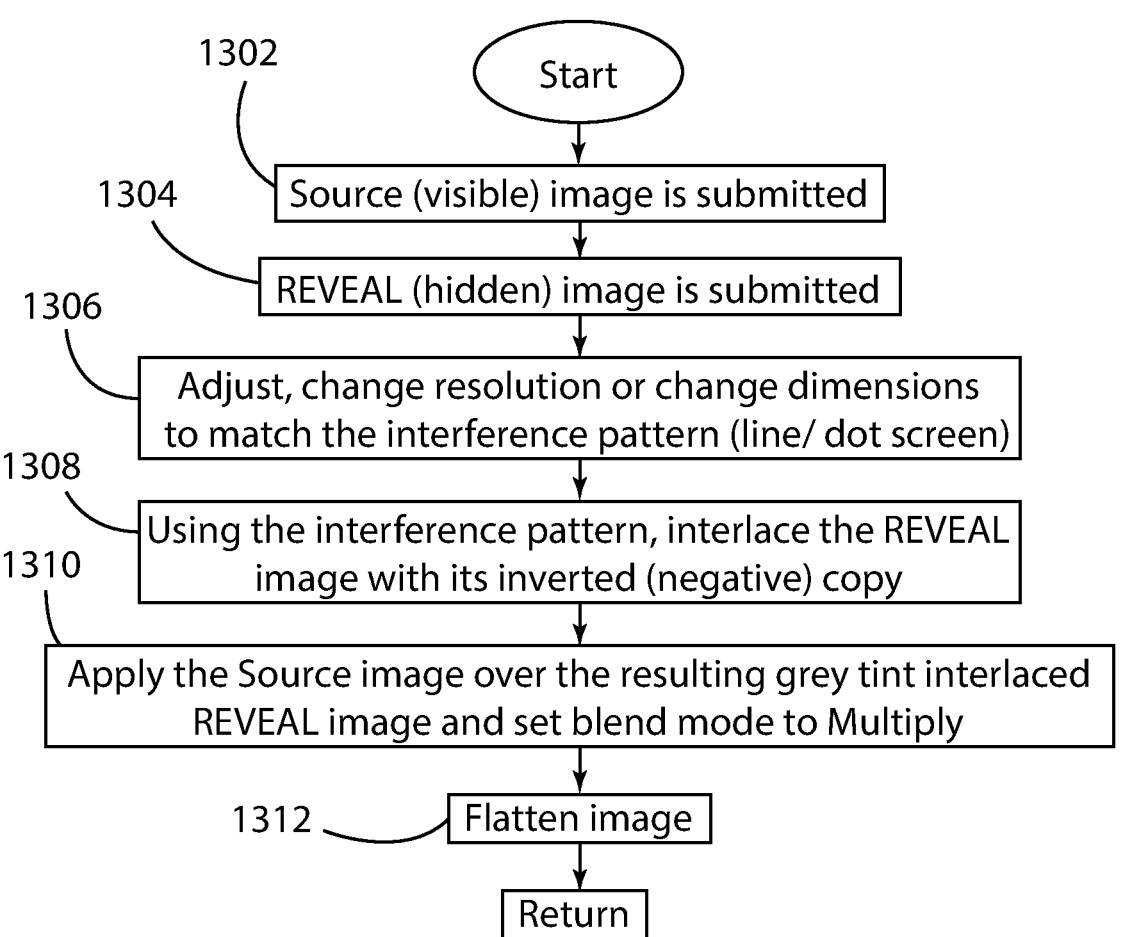

1302 Start

1304 Source (visible) image is submitted

REVEAL (hidden) image is submitted

1306 Adjust, change resolution or change dimensions to match the interference pattern (line/ dot screen)

1308 Using the interference pattern, interlace the REVEAL image with its inverted (negative) copy 1310 Apply the Source image over the resulting grey tint interlaced REVEAL image and set blend mode to Multiply 1312 Flatten image Return

Fig. 13

SELF-VERIFYING HIDDEN DIGITAL MEDIA WITHIN OTHER DIGITAL MEDIA

CROSS-REFERENCE TO RELATED APPLICATION

This application is a U.S. national phase application filed under 35 U.S.C. § 371 of International Application No. PCT/US2022/028557, filed May 10, 2022, designating the United States, which claims the benefit of U.S. Provisional Application No. 63/189,770, filed May 18, 2021, which is incorporated by reference in its entirety herein.

FIELD

Presented herein are methods for self-verifiable hidden digital media, and in particular a self-verifying hidden digital media using a novel interactive component that reveals a secondary hidden watermark.

BACKGROUND

Non-fungible tokens (NFTs) are blockchained digital assets with unique identification codes and metadata that distinguish them from each other. NFTs are gaining popularity for a number of reasons. First, some of them are selling for multi millions of dollars, which has greatly accelerated public awareness. More importantly, they are catering to the future of a mostly digital world. NFTs, built on the cryptocurrency platform are protected by blockchain technology and allow someone to prove that they are the original owners of a digital media file, whether it be art, photos, videos, music, etc., from a novel standpoint. Currently, NFTs are usable as a valid solution for protecting and proving ownership of important documents such as land deeds, tickets, art and the like and will likely expand into a wider range of sectors. Thus NFTs are evolving an important technology and will strengthen as we move further into the digital age.

One major limitation of most NFTs is that although they are completely secure in terms of chain of custody, since they are protected by the blockchain, they are vulnerable to copying via screenshots, mass digital distribution and the like. Accordingly, further improvements in this technology are desired.

It is to be understood that if any prior art information is referred to herein, such reference does not constitute an admission that the information forms part of the common general knowledge in the art.

SUMMARY

Accordingly, to advance at least the aforementioned deficiencies in the art, described herein are self-verifying hidden digital media using a novel interactive component that reveals a secondary hidden watermark.

According to one approach, a computer-implemented method of revealing at least one hidden image into a visible image, may include the steps of generating, via a processor, a first image that is visible on a computing device screen; generating, via a processor, at least one second image, the at least one second image being in an invisible or nearly invisible state to the human eye in a neutral state and visible in a user activated state.

In one embodiment, the activated state of the computing device is achieved when the computing device screen is zoomed in or out, pointer scrolled in a predetermined way, or when the first image has its window size changed.

In one embodiment, the invisible or nearly invisible state is achieved by a providing a concealing interference pattern using at least one of vertical, horizontal, cross-lenticular, hexagonal and shape-based pattern imposed over the at least one second image, wherein interlacing both positive and negative versions of the at least one second image essentially cancels itself out and being concealed as a generally smooth tint.

In one embodiment, the invisible or nearly invisible state is achieved by an encoded image displayed on a screen that contains a hidden latent image, wherein the hidden latent image is revealed by overlaying an optical decoding filter on the screen.

In one embodiment, the optical decoding filter pattern-based or color-filter based.

According to another approach, a computer-implemented method of concealing and revealing at least one image is provided which may have the steps of generating, via a processor, an image that is initially visible on a computing device screen; generating, via a processor, a first static image; concealing the initially visible image by covering it with the second static image; reverse inverting the first static image to generate a reversed second static image; and revealing the visible image by overlaying the second static image over the first static image and visible image.

According to another approach, a computer-implemented method of concealing and revealing at least one image is provided which may have the steps of, in order, of submitting a source image; adjusting, changing the source image resolution or changing dimensions to match the White/Color Noise Interference Pattern (preferably having about 50% overall density so as to appear the same to the naked eye when inverted); setting the source image as base layer; applying an interference pattern as top layer above source image; selecting all black pixels then using this selection to invert the source image; applying a second interference pattern or image; and flattening the image.

Other aspects of the invention are also disclosed and will become more apparent to persons having ordinary skill in the art to which the assemblies pertain and from the following description and claims.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 13 illustrates an exemplary static pinch to reveal process according to one approach of the present embodiments.

Figure 1:
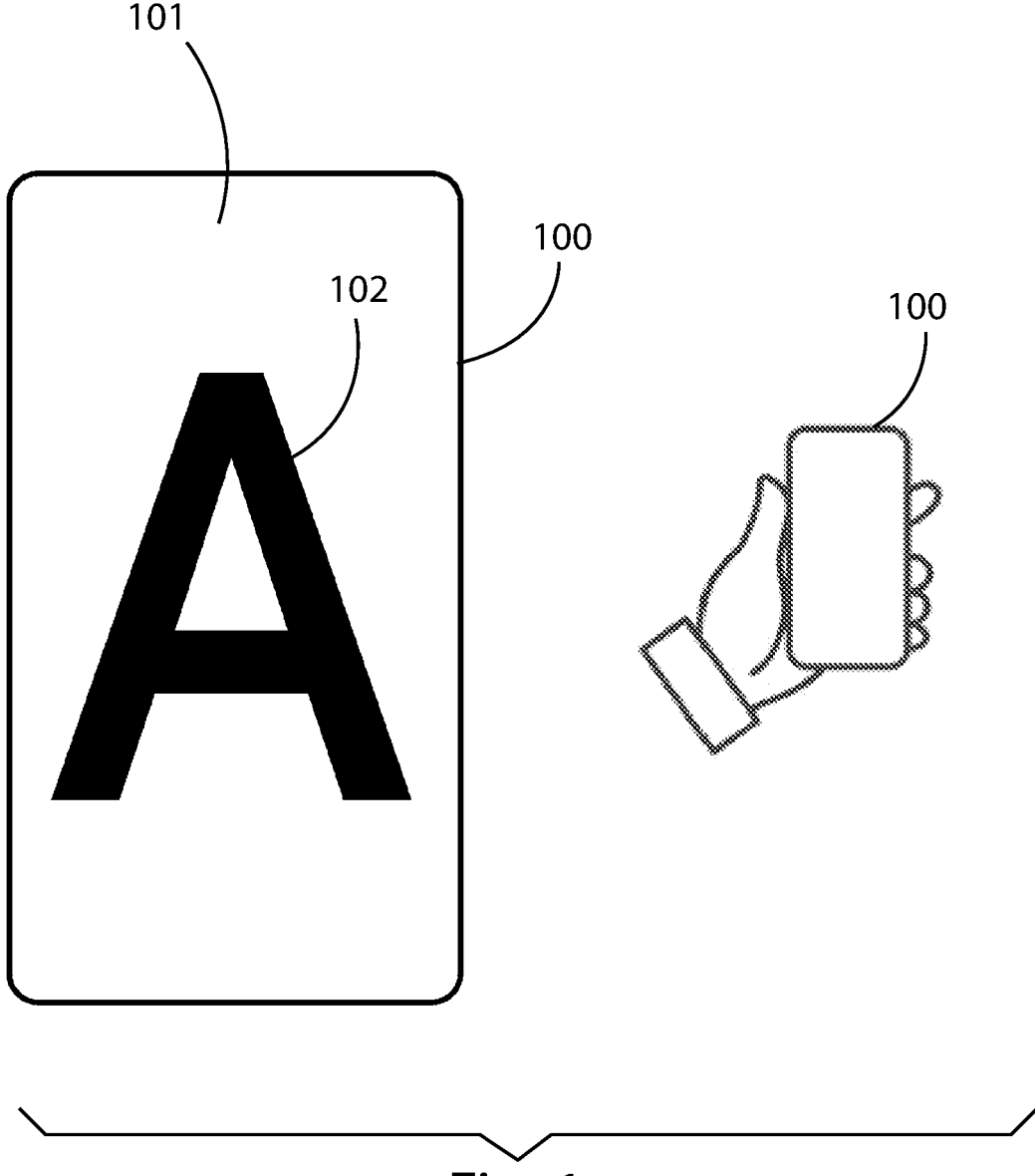
FIG. 1 illustrates an exemplary first image seen prior to changing zoom/magnification level according to one approach of the present embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by at least the appended claims.

DETAILED DESCRIPTION

Presented herein are methods and systems to integrate hidden interlaced features, such as steganographic features, to make, for example, Non-Fungible Tokens (NFTs) more secure from screenshot copying, and to otherwise prevent unauthorized digital theft. The present methods and systems help ensure that only the rightful owner of the original NFT file will have access to the protected data, mark, media, code, etc. contained within. This novel security feature integration not only protects the NFT, but also enhances the appeal and value with a novel interactive component that, at least in one embodiment, reveals a secondary hidden watermark.

The following is a glossary of some of terms used in this disclosure:

Blockchain: A blockchain is specific type of decentralized database that is distributed, often publicly, as a digital ledger having of records called blocks that are used to record transactions across many computers so that any involved block cannot be altered retroactively, without the alteration of all subsequent blocks. As new data is received, this data is entered into a block. Once that block is filled with data it is "chained" onto the previous block. Thus, the data chained together in chronological order. By decentralization no one single person or group has control of the data. And once entered, the data is permanently recorded.

Non-Fungible Tokens (NFTs): a unit of data (a cryptographic asset) stored on a digital ledger, called a blockchain (see above), that certifies a digital asset to be unique and therefore not interchangeable. It has unique identification codes and metadata that distinguish them from each other NFTs and can be used to represent items such as photos, videos, audio, and other types of digital files.

Moiré effect: a visual perception that occurs when viewing a set of lines or dots that is superimposed on another set of lines or dots, where the sets differ in relative size, angle, or spacing. The moiré effect can be seen when looking through ordinary window screens at another screen or background.

Steganography: a technique of hiding secret data within an ordinary, non-secret, file or message in order to avoid detection; the secret data is then extracted at its destination. The use of steganography can be combined with encryption as an extra step for hiding or protecting data.

Watermark: as used herein refers to a faint or hidden interlaced digital image or design that may be revealed by certain screen-decoding steps of a user.

There are several ways to integrate a digital screen-decodable hidden interlaced watermark features and ways interact with them. Two exemplary functions are provided herein: a self-verifying NFT and an IRL NFT (In Real Life). The IRL NFT which bridges the gap between digital and physical by requiring a secondary physical decoder to reveal the watermark. To interact with or self-verify secure NFTs, the owner of the original file can simply pinch or zoom out on the media file one a phone or computer device to reveal a secondary hidden watermark. It can also be set to a certain size that allows for automatic decoding via a dedicated viewer, app or website that resizes the image so that the frequency matches the digital viewing screen. Furthermore, this effect can be calibrated to specifically interfere and decode when viewing a digital image on existing websites, apps, smartphone photo albums or social media platforms when posted.

According to one approach, this can be accomplished by creating an interference pattern that when aligned with the resolution of the screen, causes a moiré effect that reveals the hidden watermark. If combined with a positive and inverted or negative interlaced image, the watermark is mostly (e.g., under 10 percent visible) invisible to the naked eye prior to verifying. Because of the fine pixel-level details, any attempt to screenshot simply does not capture sufficient detail (i.e., not 100 percent quality detail) to preserve the hidden watermark. Additionally, any attempt to email, text or post (in some cases even the original file) the applied compression (i.e., a method of reducing the number of bits (zeros and ones) in a digital signal by using mathematical algorithms to eliminate redundant information) will also destroy the hidden watermark, making security an added benefit of this feature.

This hidden watermark not only acts as a seal of authenticity, but also provides the owner with an additional collectable NFT component that only they are able to view. Additionally, this creates an opportunity for the person creating/minting the NFT to encode a secret message, pin code or even a QR code that links to a different site/location and unlocks, for example, additional digital asset(s). IRL NFTs work similarly to the self-verifying NFTs, only they require a physical decoder overlaid onto the phone or computer screen viewing the NFT. This decoder can be based on optical or barrier lenses; either lenticular, cross-lenticular, micro-array/fly's eye, concentric circle/fresnel, magnifying, etc., or it can be based on color or pattern filtering.

The main compromise or limitation of these secure interactive NTFs is that they require interlacing within the NFT. This means, for example, that on a pixel level, every other pixel contains the hidden NFT watermark. It is noted that this is merely an example and that many other types of pixel repeating frequencies are possible depending on image resolution, size and encoding technique) This results in a slight interference or quality reduction of the original NFT. This can be avoided by only applying the effect to a segmented portion of the NFT or by combining multiple encoding techniques such as multiple encoding angles or color filtering.

Embodiments may include, but are not limited to, hidden exclusive NFT art, photos, videos, gifs, anti-copy/screenshot protection, special access deleted scenes/exclusive content, digital trading cards, protected copyright media, non-transferable access codes or tickets, hidden cyphers, codes, serial numbers, passport/ID numbers, expiration dates, etc., physical decoder cards or other hardware, physical decoders fixed in certain locations permanently such as stadiums, museums, landmarks, and the like and combinations thereof. Examples of exemplary embodiments are shown in FIGS. 1-7.

Figure 8:
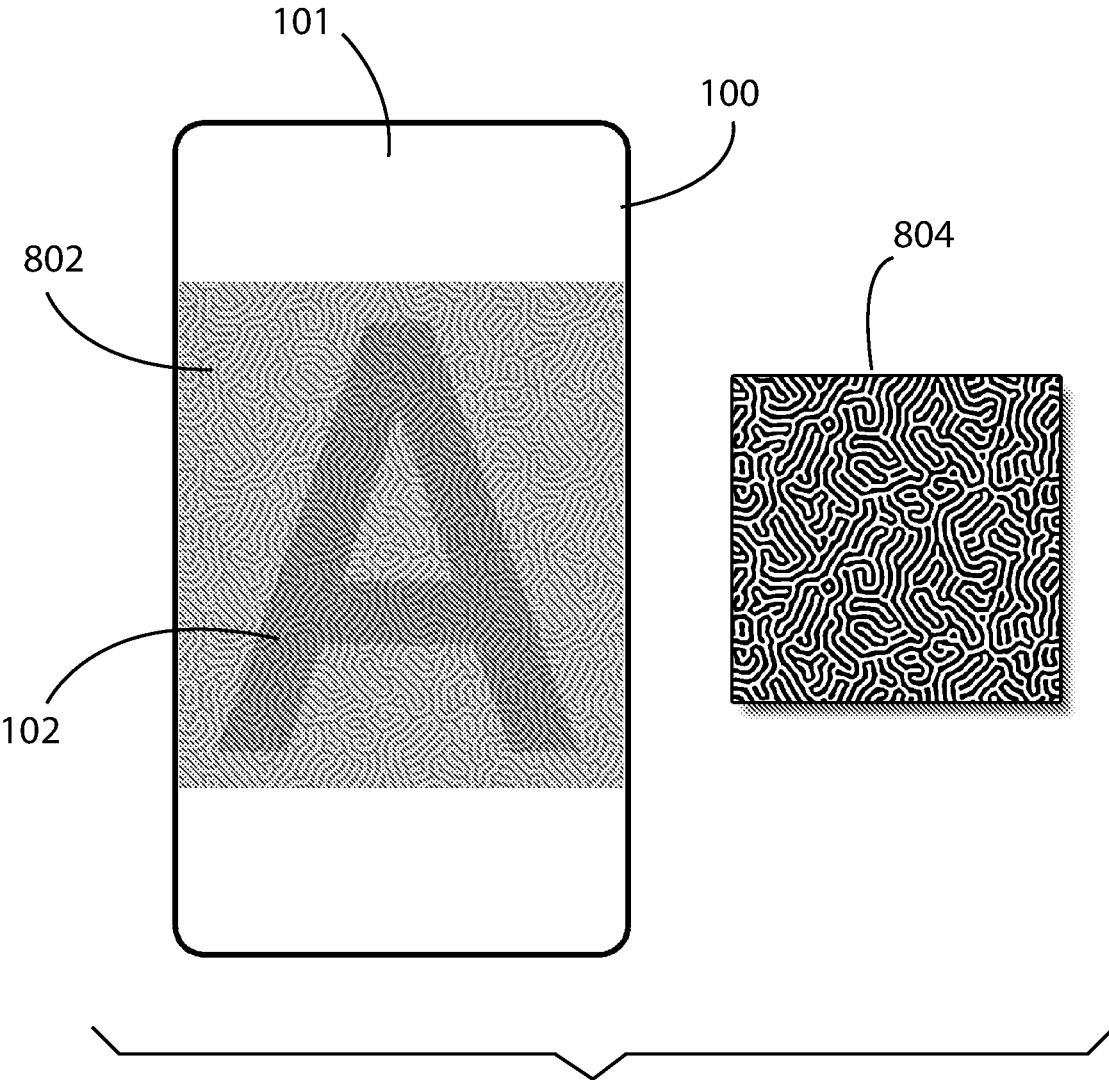
FIG. 8 illustrates an exemplary optical decodable hidden image on screen with physical decoding filter next to it according to one approach of the present embodiments.
Figure 9:
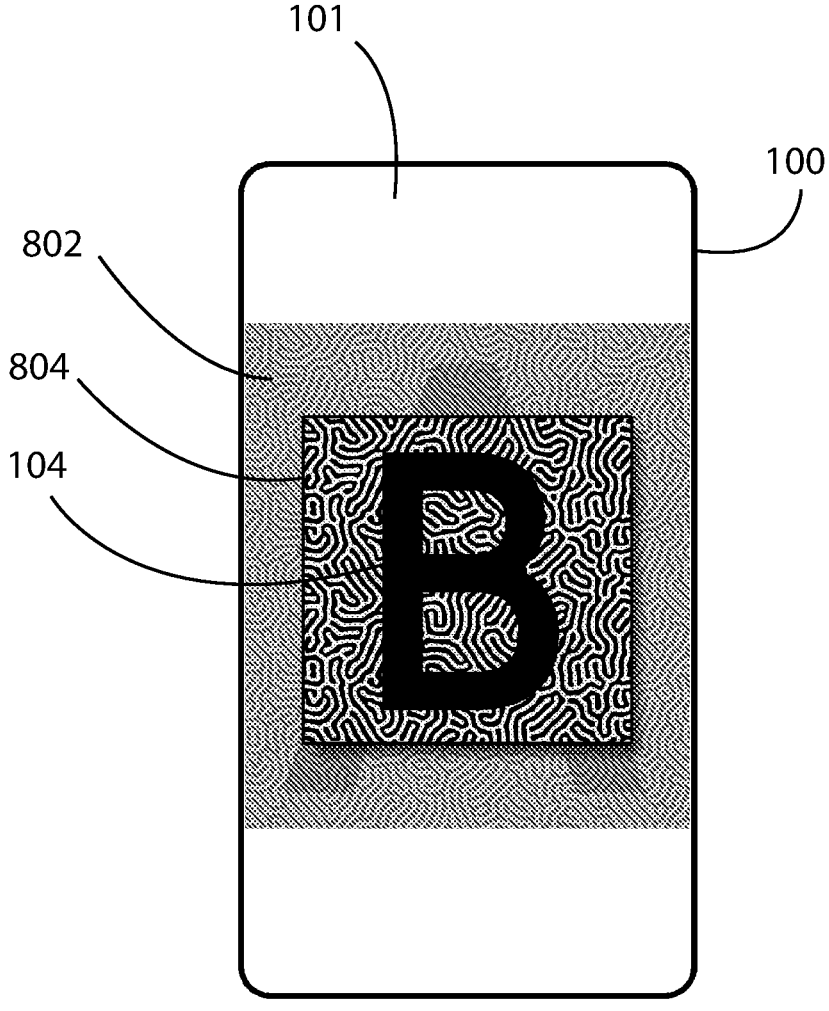
FIG. 9 illustrates an exemplary decoded image seen after placing and aligning physical decoding filter on top of screen according to one approach of the present embodiments.

Other exemplary embodiments of On-Screen Optical Decodable Hidden Watermark are found in FIGS. 8-9. Utilizing many of the same techniques and background of the Screen-Decodable Hidden Interlaced Watermark for Digital Media and NFTs, this feature can combine the ability to reveal the concealed media by utilizing a physical external decoder placed on top of or used to view the digital screen displaying the effect.

This external decoder must be transparent or translucent in nature, in order to view the screen through it. The decoder can be optical, having lenticular, cross lenticular, fly's eye, microarray or any other optical pattern. It can also be a printed decoder with any interference pattern, repeating pattern or array including, but not limited to, line screens, dot screens, hexagonal arrays, cross-lenticular, square, rectangular, triangular, wavy line, sine wave, zig-zag, circular, concentric circular, concentric square, concentric rectangle, concentric oval or any other concentric shape/pattern or any other geometric pattern, and the like or combinations thereof. It can also be based on white or color noise patterns, camouflage, 2D or linear barcodes, etc.

To make an encoded concealed image decodable via one of the external physical decoders described above, the interference pattern with "difference" blending mode applied to image "B" (as shown in the figures) should match the decoder image in some way so as to directly interfere with, thus decoding or revealing the concealed image (i.e. lenticular-based decoders will interfere with and reveal concealed images interlaced with lenticular-based interference patterns, whereas other artistic geometric pattern-based decoders will interfere with and reveal concealed images interlaced with corresponding matching patterns.)

Additionally, the external physical decoder can be based on color-filtering. In this case, the decoder can be a solid or pattern-based color filter, utilizing any combination of the previously described types of interference patterns, whereby colors such as RGB (red, green, blue) and CMY (cyan, magenta, yellow) can be used to selectively filter out other colors and reveal concealed images within an encoded image. Primarily, the RGB color spectrum is the best candidate for this technique, as it is optimized for filtering out native RGB media as displayed on most digital color screens.

To make color-filter based concealed image(s), one or multiple images are directly placed within the corresponding color channels of the graphic file. For example, a standard RGB (red, green, blue) color image, which is made of different component images within each color channel, each having varying densities to represent the resulting visible color image, can be altered to contain different, non-related image components that can only be seen clearly when viewing through a color filter. For example, the letter "A" can be placed in the red channel, the letter "B" in the green channel and the letter "C" in the blue channel. The resulting image will be a multicolored mixed up image showing parts of each letter in different overlapping colors that are opposite of the channels they were placed in (i.e. images placed in the red channel will display cyan, images in the green channel will display magenta and images in the blue channel will display yellow). These images can be somewhat related or completely unrelated. For example, there can be an image of an animal or person in the red channel, a logo in the green channel and a QR code in the blue channel. To selectively filter out all the images except for one, the image has to be viewed through a transparent/translucent filter colored to match the channel that that image is in (i.e., a red filter will show the red channel image, a green filter will show the green channel image and a blue filter will show the blue channel image).

Figure 10:
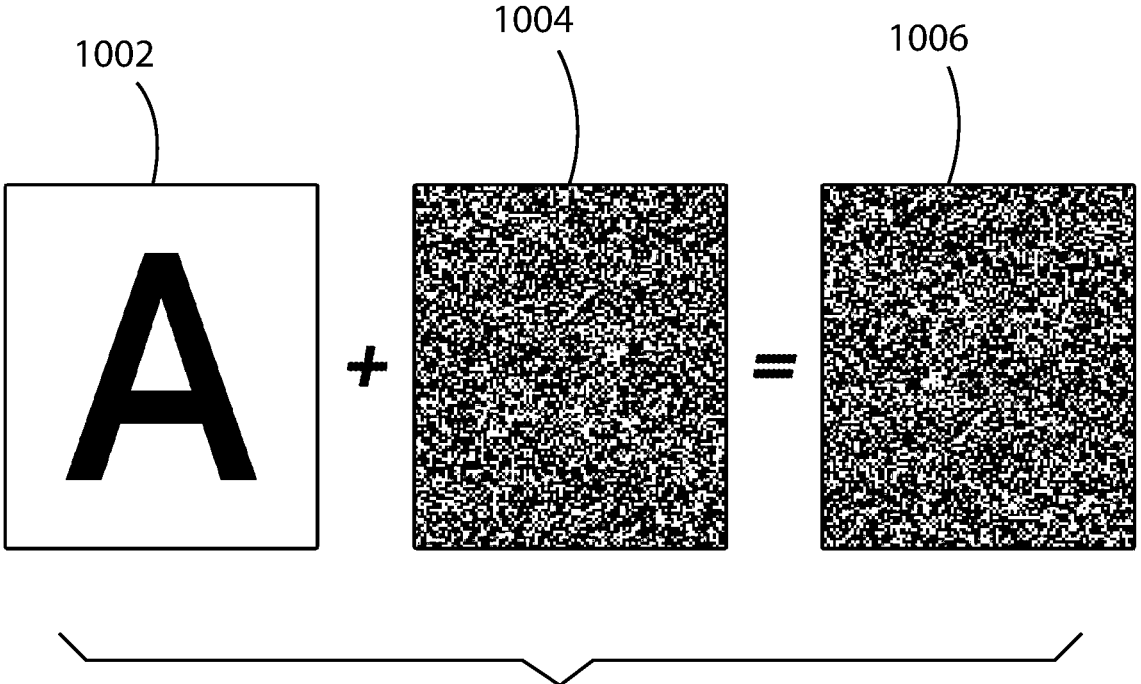
FIG. 10 illustrates an exemplary encoding process of image-based encryption showing input hidden image, static noise pattern and resulting encrypted noise pattern containing hidden input image according to one approach of the present embodiments.
Figure 11:
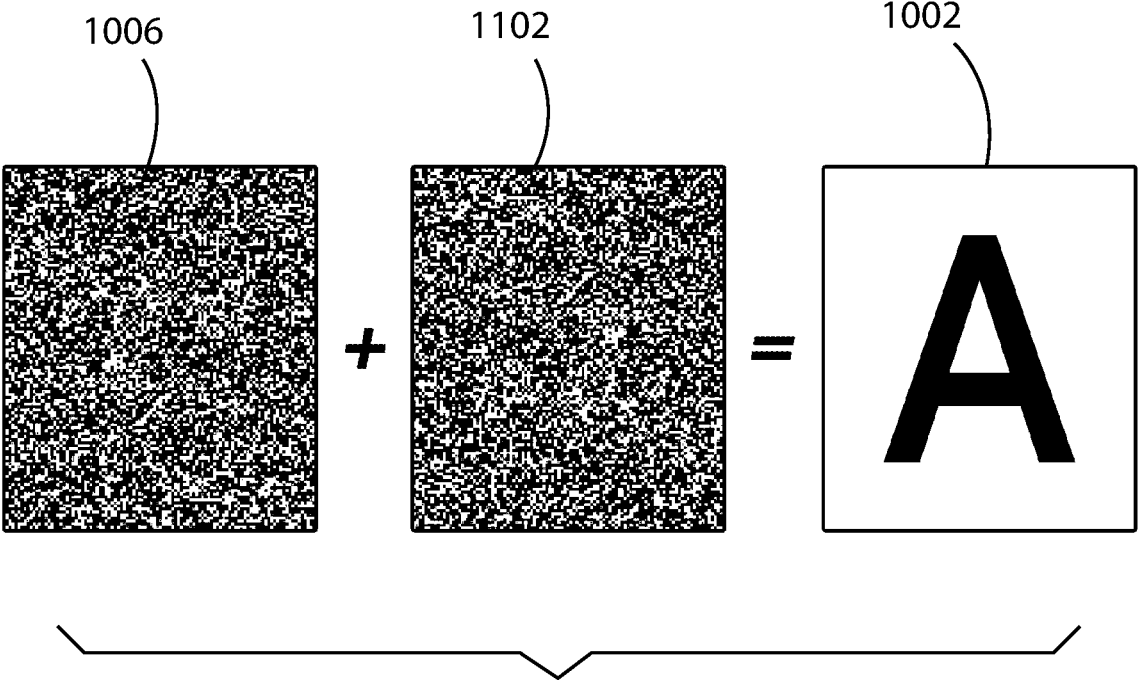
FIG. 11 illustrates an exemplary decoding process of image-based encryption showing encrypted noise pattern containing hidden input image, the original static noise pattern used to encrypt and the resulting decoded original input image according to one approach of the present embodiments.

Other exemplary embodiments may include Image-Based Encryption of Digital Media and NFTs, such as shown in FIGS. 10-11. This image-based encryption method completely conceals, scrambles and/or interferes with a visual digital media file such as a photo, video, animated gif or any other visual digital asset in order to restrict viewing access. By using a still or animated white or color static noise image or video as an interference pattern, the original source media file can be significantly if not completely concealed. The only way to retrieve the original file is to perform a reverse function with the exact same static noise pattern. This method can be applied to any visual digital media including NFTs, photos, videos, etc. to securely hide, restrict viewing access, protect or make exclusive. 3D technology may also be employed.

This white/color noise pattern can be virtually any graphic pattern, including but not limited to: static alternating pixels, abstract geometric repeating/random patterns, alphanumeric based patterns, logos, and the like and combinations thereof, in black and white or color, that represents an overall density of, for example, in the range of 20% to 60% and preferably about 50%. This is an important requirement, as this ensures that when performing the inverting step to conceal the media, the end result of 50% density will be as close to a 50% tint as possible. Otherwise, the end result will not be a smooth tint. Rather, it will show areas that noticeably differ in terms of density, which will not conceal the image to a satisfactory degree. This effect can be applied multiple times to the same media using different interference patterns that further conceal the nature of the original media. In fact, this can be performed an infinite number of times and the original source media file can still be retrieved so long as each applied interference pattern is subsequently applied as a reverse decoding function. Additionally, patterns or images that do not have a 50% density can be used after the primary image-based encryption is applied to serve as a distracting or decoy image, which can be removed during the decoding process.

The static noise pattern can also be animated, having multiple frames rather than just one. This will result in an animated encoded image, whereby the decoding process will require the same animated static noise pattern to decode, reverse the process and recover the original hidden input image. Using this method increases complexity level and thus security level.

According to one approach, a secure way of achieving this effect is to generate a variable form of the static noise pattern, based on a hash of some other data. For example, in the case of NFTs, it is possible to first mint the NFT then use any combination of the blockchain code from the transaction, the username, the platform signature, date/time or any other data to create the static noise image via a hashing algorithm. Another approach is to use a public and private key, password, crypto pass phrase, etc. to generate the pattern. This makes the image-based encryption process much more unique and secure as it is tied to variable data. If done property, authorized parties that have access to the data used to generate the hash would be able to regenerate the static noise pattern and decode the media file. By using this method, it is possible to create a software/website/app-based viewer that is able to automatically retrieve the data needed to generate the hash, which generates the static noise pattern and ultimately decodes/reveals the hidden content. This can be done seamlessly as a background function so that the user is able to easily view the media file, however, if the file were to be intercepted in transit or stolen from a device, the culprit would not be able to decrypt or decode the hidden content.

Examples of the present embodiments may be found in the figures. FIG. 1 shows a computing device, such as a smartphone 100, that displays a first image "A" 102 on its screen 101 (smartphone or laptop/computer monitor or tv, etc.) prior to changing zoom/magnification level. This can be any still or animated image (jpg, png, gif, etc.) or even a video.

Figure 2:
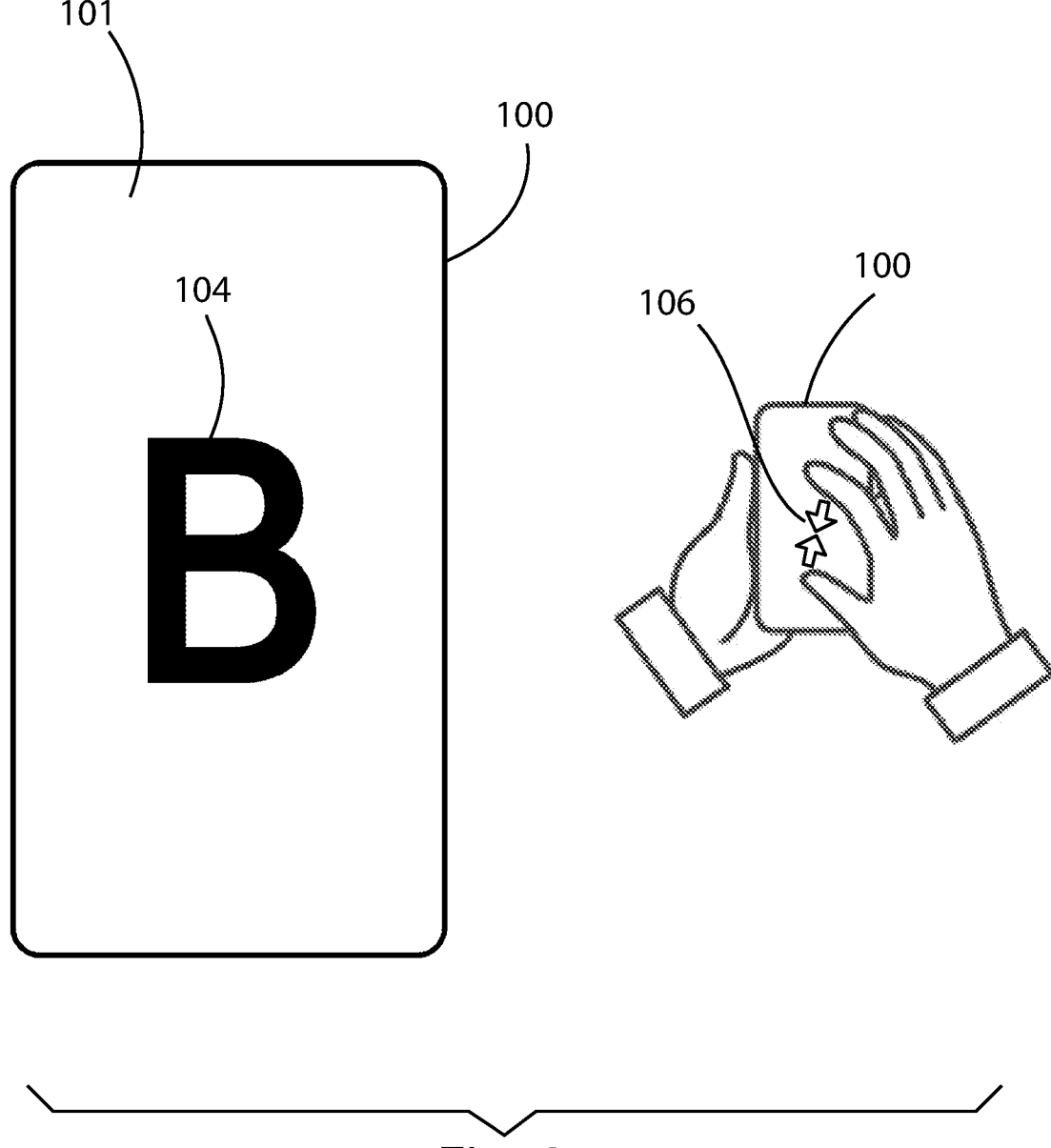
FIG. 2 illustrates an exemplary image seen after changing zoom/magnification level according to one approach of the present embodiments.

FIG. 2 shows a second image "B" 104 seen on the screen 101 (smartphone or laptop/computer monitor or tv, etc.) after changing the zoom/magnification level. On a smartphone, this is generally done by using a gesture such as pinching or spreading fingers on screen, whereas other screens may involve a similar gesture, a scrolling a mouse wheel or the changing of a window size. This can be any still or animated image (jpg, png, gif, etc.) or even a video.

Figure 3:
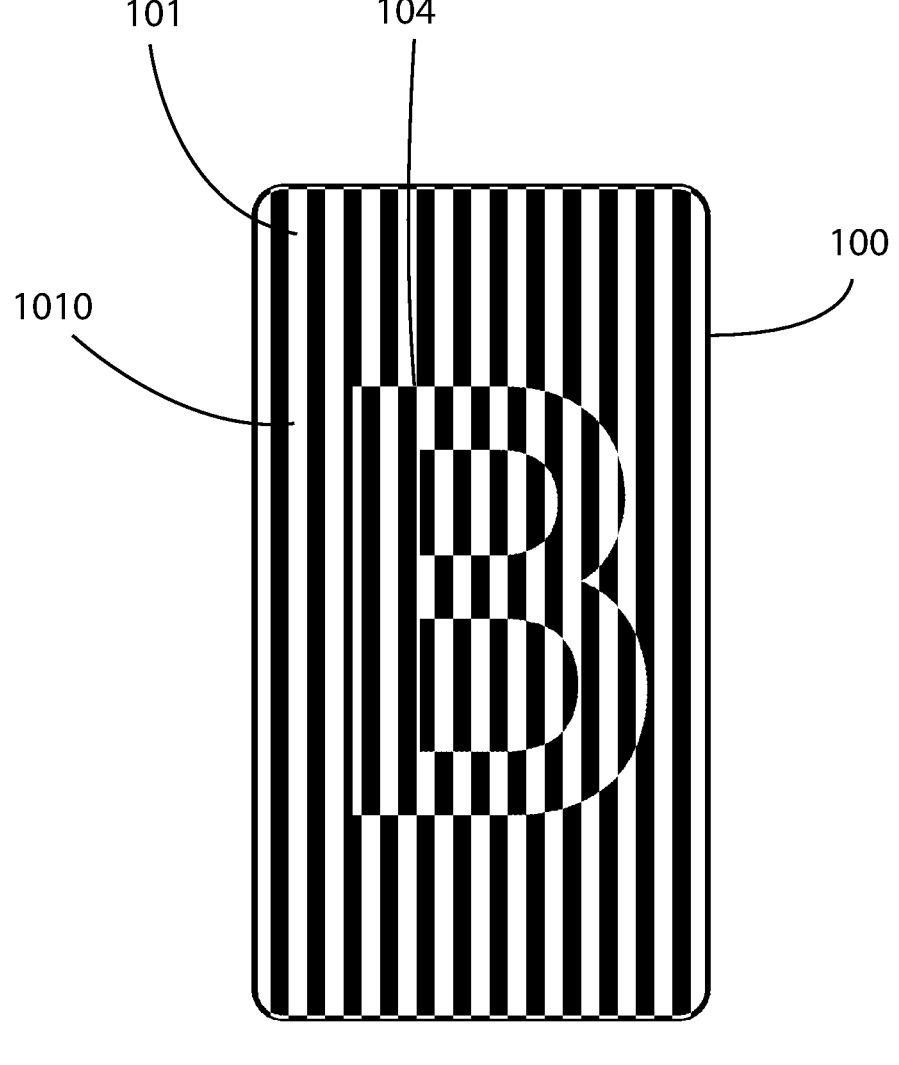
FIG. 3 illustrates an exemplary enlarged vertical line screen pattern with inverting 'difference' blending mode applied to "B" Image—interlaced inverted image conceals itself according to one approach of the present embodiments.

FIG. 3 shows an enlarged view of the concealing interference pattern to show exemplary detail. By placing either a specific vertical, horizontal, cross-lenticular, hexagonal or any other line, shape-based pattern array 108 and 1010 over the second "B" image 104 and setting graphic blending mode to "difference" the "B" image 104 will be inverted wherever the pattern overlaps. Preferably, this screen is a 50% density pattern, whereby interlacing both positive and negative versions of the "B" image 104 results in the "B" image essentially cancelling itself out and being concealed as a generally smooth gray tint. This step can be applied to black/white and color media.

Figure 4:
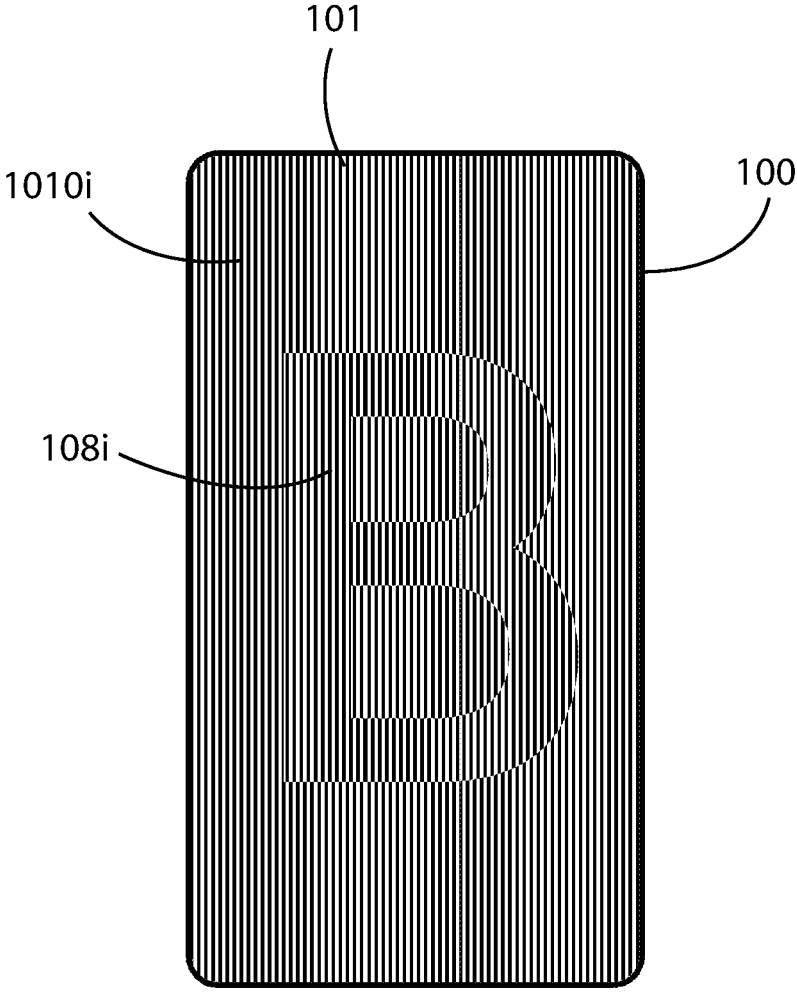
FIG. 4 illustrates an exemplary fine vertical line screen pattern w/ inverting 'difference' blending mode applied to "B" Image—interlaced inverted image conceals itself according to one approach of the present embodiments.

FIG. 4 expands on the example in embodiment shown in FIG. 3, this is a finer line pattern 108i and 1010i showing a more accurate display of the resulting "B" image after the "difference" (i.e., graphic inverting (positive to negative) blending mode is applied. This interference pattern should be designed to be as fine as possible while still being able to align with the destination screen resolution when adjusting zoom/magnification level. The "B" image 104 is mostly concealed at this point. Any 'artifacts' or small blemishes that show up as a result of the pattern interfering with the "B" image and/or the "B" image having significant variations in density and/or color tone throughout the image can be further concealed by overlaying the "A" image 102 and adjusting or using a different interference pattern. Different angles and frequencies of the inference pattern can also be used.

Figure 5:
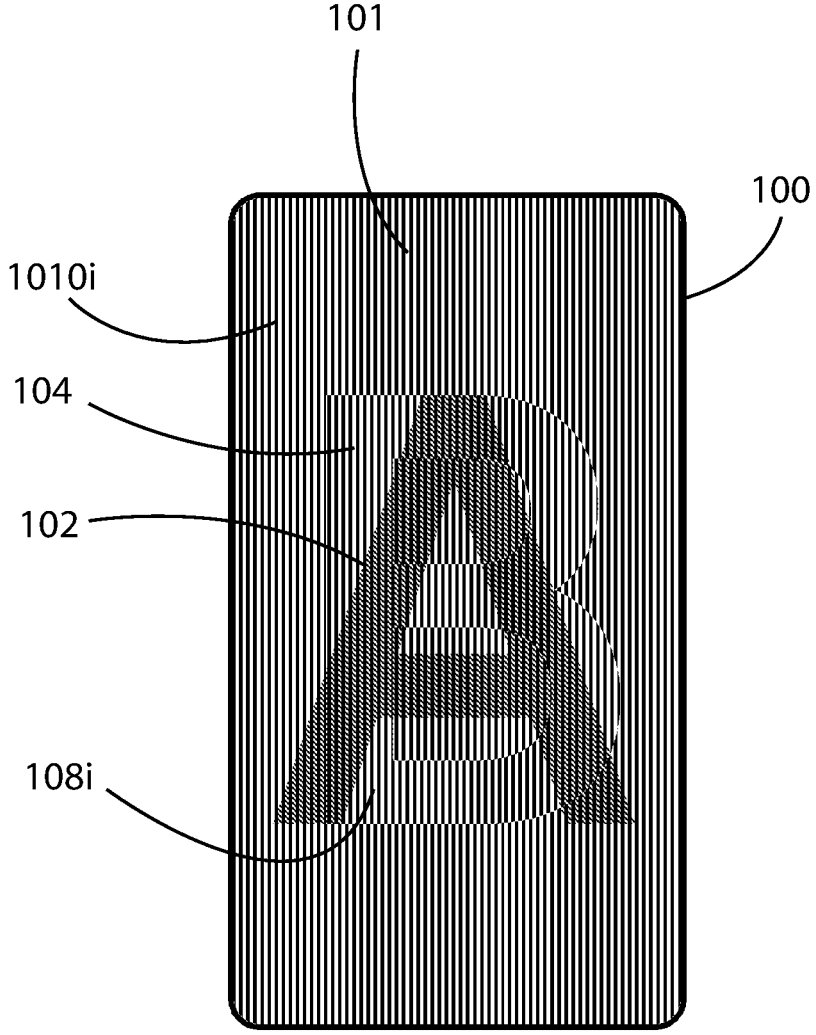
FIG. 5 illustrates an exemplary concealed interlaced "B" image with "A" image overlayed according to one approach of the present embodiments.

FIG. 5 illustrates an example view of a final resulting composite image with the concealed "B" image 104 overlayed by the "A" image 102. The overlapping "A" image 102 should have an opacity less than 100% so that the interlaced concealed "B" image 104 can be seen through the "A" image 102. If necessary, the opacity and/or blending mode of image "A" 102 can be set to "multiply" (i.e., transparency blending mode) to enhance the quality of the verification process. As mentioned in examples in FIGS. 1 and 2, either or both of the "A" and "B" images can be any still or animated image (jpg, png, gif, etc.) or even a video. There can be black and white images hidden within other black and white or color images, color within color, still within still, still within animated, animated within still, animated within animated, etc. In some cases, animated images or videos can also be used to help conceal any "artifacts".

Figure 6:
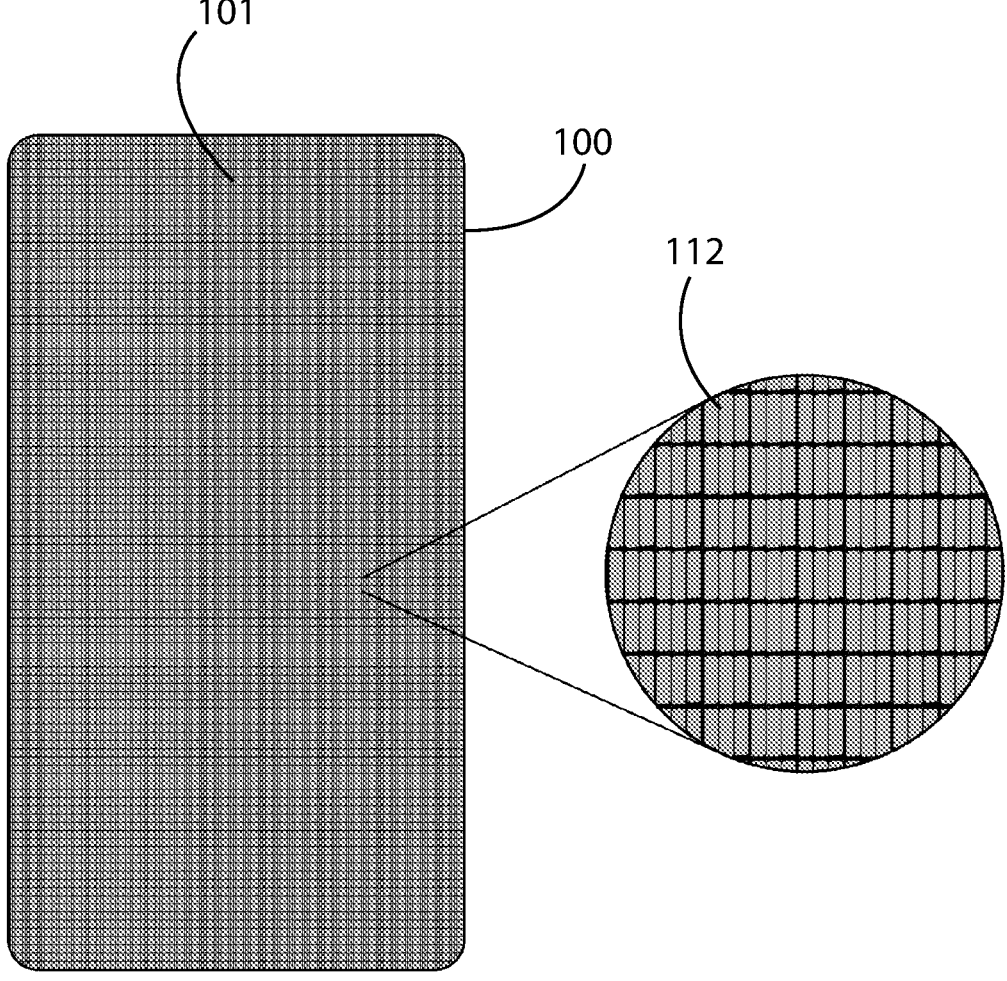
FIG. 6 illustrates an exemplary enlarged view of screen pixel grid according to one approach of the present embodiments.

FIG. 6 shows an enlarged view of an example pixel grid on a screen 101, in this case, a rectangular RGB (Red, Green, Blue) array 112. The object of the present embodiments is to directly interfere with this screen pixel arrangement. These pixels can be linear, rectangular, square, hexagonal, or any other repeating shape-based pattern array or combination thereof.

Figure 7:
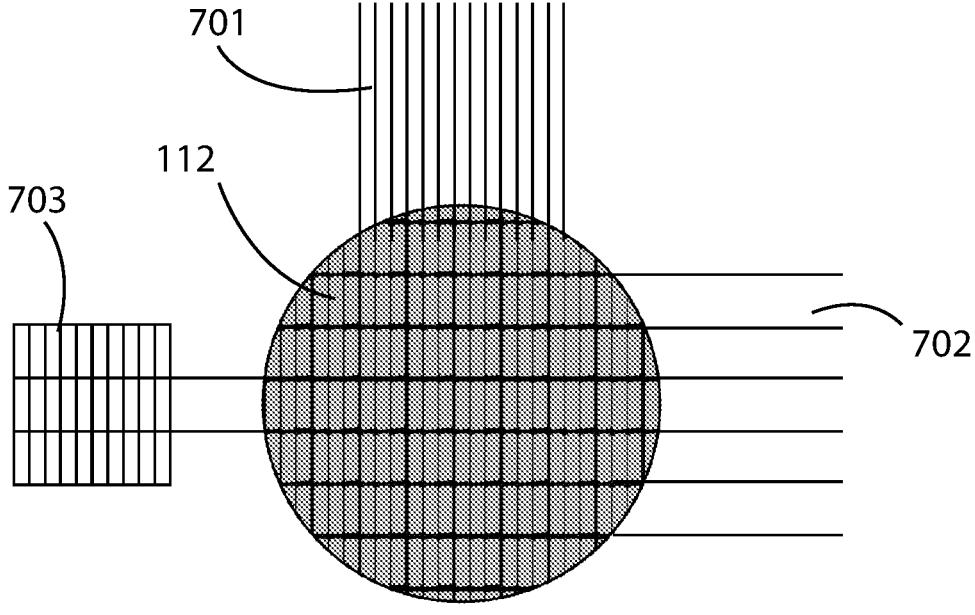
FIG. 7 illustrates an exemplary enlarged view of screen pixel grid showing vertical line frequency (701), horizontal line frequency (702) and cross-lenticular grid (703) according to one approach of the present embodiments.

FIG. 7 expands on FIG. 6 showing a magnified view of an example pixel grid 112 on a screen, particularly showing that there are different repeating line screen/arrays having different LPI (lines per inch) frequencies, which can be selectively interfered with to reveal the concealed "B" image 104. The vertical line screen 701 is the finest and has the highest LPI of 144 ppi, for example, whereas the horizontal line screen 702 is much courser and has a lower LPI of 48 ppi, for example. These frequencies will vary depending on screen resolutions and are provided for exemplary purposes. Additionally, in this case, there is a tertiary repeating pattern array in the combination of these two line screens, resulting in the repeating rectangular grid array 703. Any or all of these patterns can be chosen to be interfered with and will directly affect the design of the interference pattern that conceals image "B" 104. It is also possible to encode multiple "B" images that utilize the different frequencies of the pixel grid and are revealed at different zoom/magnification levels when verifying. For example, a first concealed image "B1" 104 can be seen when zooming out slightly, while a second different concealed image "B2" (not shown) can be seen when zooming out farther. Additionally, it is worth pointing out that the interference with the screen pixels for a single concealed image "B" 104 can occur a different zoom/magnification levels depending on the frequency of the concealing pattern and the viewing screen. For example, with any lenticular array, it is common for interference to occur at a 1:1 matching frequency as well as a 1:2/2:1 ratio frequency. Finally, in addition to the varying frequencies of the concealing pattern, it is also possible to vary the angle of this pattern. In this case, the concealed image "B" 104 can be revealed by rotating the image or a combination of rotation and zoom/magnification change.

FIG. 8 shows another approach of the present embodiments using an encoded image displayed on a smartphone screen that contains a hidden latent image. The decoder 804 shown to the right of the smartphone is a corresponding optical decoding filter. This filter needs to be transparent/translucent in nature so that the image on the phone can be viewed through the decoder. In the case of pattern-based decoders, they must be placed directly on the surface of the viewing screen and aligned with the digital image 802. In the case of color-filter based decoders, they can be used to view the digital image from a distance and do not need to be in contact. Notice how the encoded image pattern matches the decoder pattern. This pattern can be almost any geometric pattern.

FIG. 9 shows the resulting decoded image 104 after using the decoder 804 to interfere with the encoded digital image 802. This resulting image can be still or animated, black and white or color, and it can be oriented at different angles. It is also possible to have multiple hidden images that show up with different decoders or at different angles/orientations with the same decoder.

FIG. 10 shows an exemplary encoding process of the image-based encryption. An input image 1002, which can be simple, complex, black and white, color, still or animated is scrambled using a static noise pattern 1004 via a selective inverting process that results in a partially or completely concealed image 1006 based on the static noise pattern(s) that were used to generate it.

FIG. 11 shows the decoding process of the image-based encryption. Starting with the resulting encoded image 1006 from the previous step, the original static noise pattern(s) 1004 that was/were used to generate the encoded image are used in a reverse inverting process 1102 that results in recovering the original input hidden image.

Figure 12:
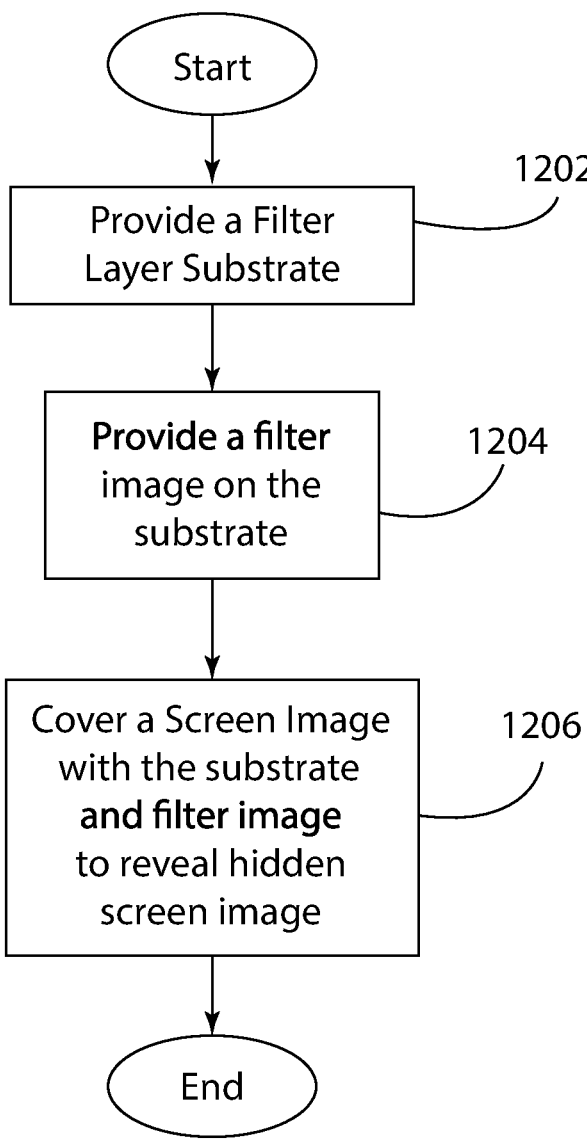
FIG. 12 illustrates an exemplary process of forming an optical device according to one example of the disclosure according to one approach of the present embodiments.

FIG. 12 illustrates an example of an optional process of constructing an optical device having a substrate for use with the embodiment of FIGS. 8-9. The method includes providing a substrate layer in operation (step) 1202, the substrate layer including features that render or can contain a filter image. In step 1204 a filter image layer is provided on the substrate layer. In step 1206, a screen image is covered with the substrate and filter image to reveal a hidden image.

FIG. 13 illustrates an exemplary static pinch to reveal process according to one approach of the present embodiments. The process starts and at operation 1302 where a Source (visible) image is submitted. Next, at operation 1304 a REVEAL (hidden) image is submitted. Next at operation 1306 the process Adjusts, changes resolution or changes dimensions to match an interference pattern (line/dot screen). Next, at operation 1308, using the interference pattern, the process interlaces the REVEAL image with its inverted (negative) copy. In other words, overlay and register the interference pattern, select all black pixels in the inference pattern then use selection to invert REVEAL image. The resulting image should appear grey (some artifacts or colors variations are normal). Next at operation 1310 applies the Source image over the resulting grey tint interlaced REVEAL image and sets blend mode to Multiply. Next, at operation 1312 the image is flattened.

Figure 14:
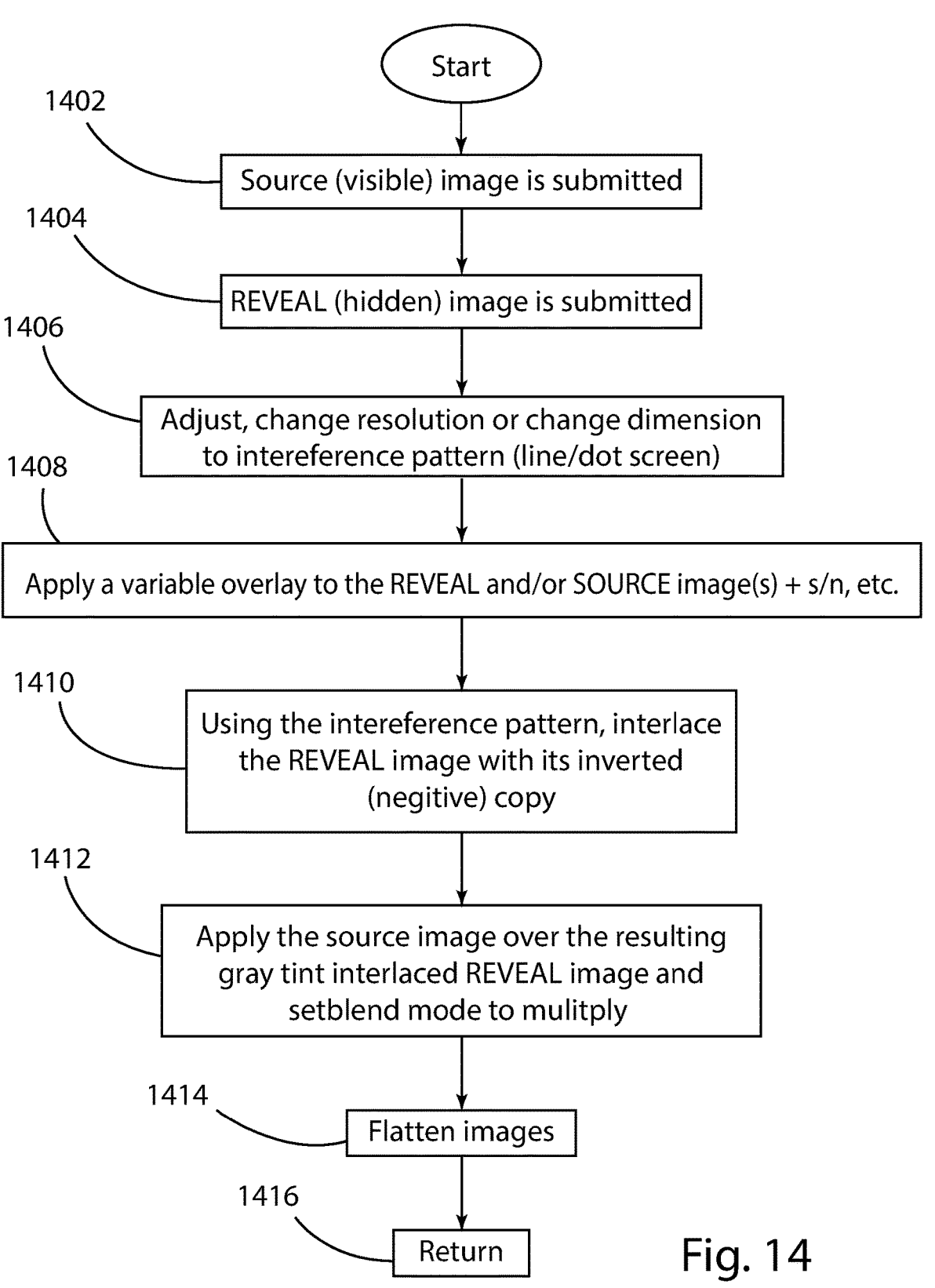
FIG. 14 illustrates an exemplary variable pinch to reveal process according to one approach of the present embodiments.

FIG. 14 illustrates an exemplary variable pinch to reveal process according to one approach of the present embodiments. The process starts and at operation 1402 where a Source (visible) image is submitted. Next, at operation 1404 a REVEAL (hidden) image is submitted. Next at operation 1406 the process Adjusts, changes resolution or changes dimensions to match an interference pattern (line/dot screen). Next, at operation 1408 the process applies a variable overlay to the REVEAL and/or SOURCE image(s). This can contain anything from a name, date, logo, s/n, barcode, blockchain code, etc. Templates may be designed for different applications. For example, standard watermark images for platforms might have a repeating logo+s/n (serial number), and the like, while NFTs might have the username of the original minter or the blockchain code or the IPFS (Interplanetary File System) hash to the original file, etc. Next at operation 1410, using the interference pattern, the process interlaces the REVEAL image with its inverted (negative) copy. In other words, overlay and register the interference pattern, select all black pixels in the inference pattern then use selection to invert REVEAL image. The resulting image should appear grey (some artifacts or colors variations are normal). Next at operation 1310 applies the Source image over the resulting grey tint interlaced REVEAL image and sets blend mode to Multiply. Next, at operation 1312 the image Is flattened.

Figure 15:
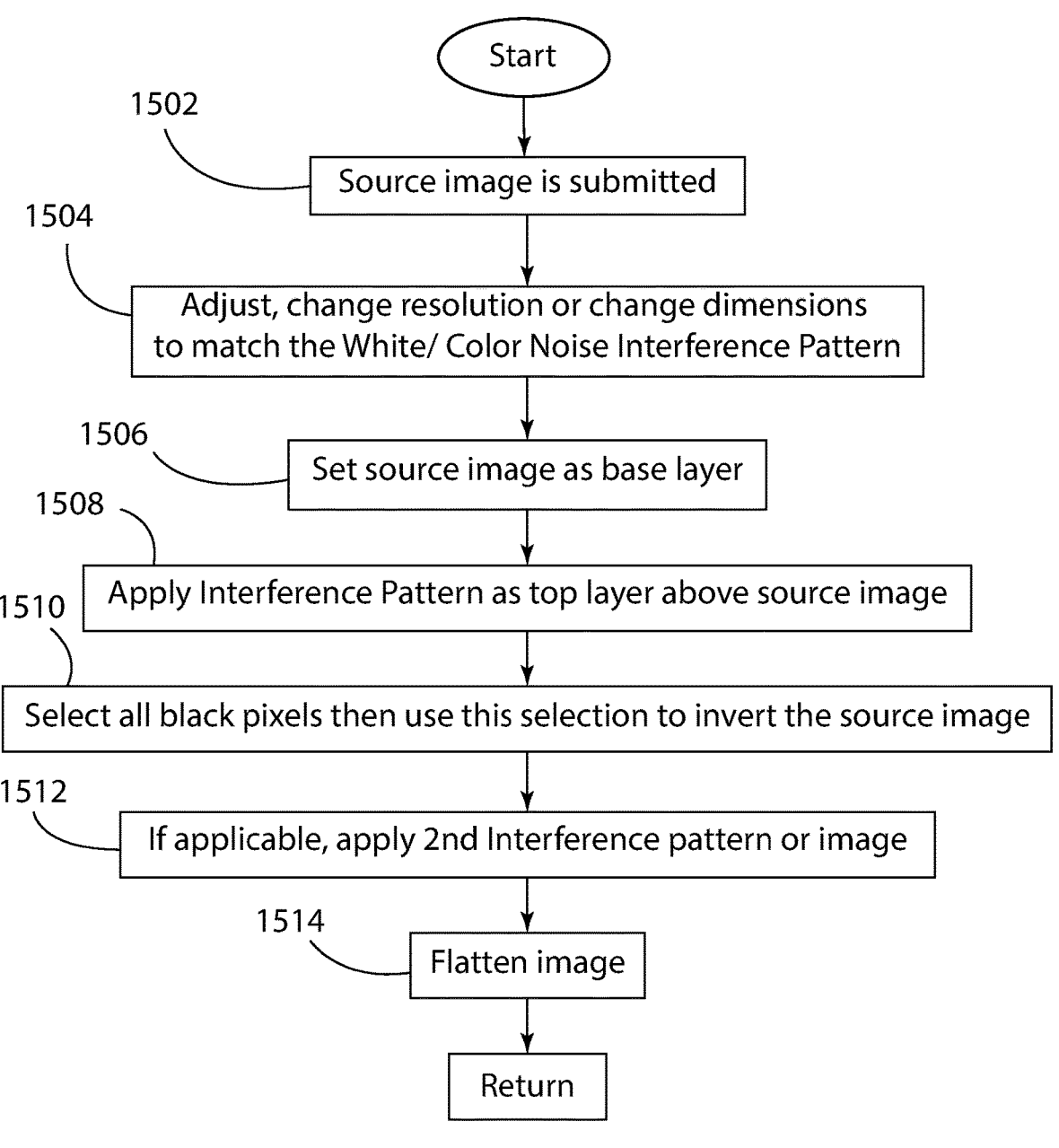
FIG. 15 illustrates an exemplary static image-based encryption process according to one approach of the present embodiments.

FIG. 15 illustrates an exemplary static image-based encryption process according to one approach of the present embodiments. At operation 1502 a source image is submitted. Next at operation 1504, the process adjusts, changes resolution or changes dimensions of the source/input image to match the White/Color Noise Interference Pattern (preferably having about 50% overall density so as to appear the same to the naked eye when inverted). Next, at operation 1506 the process sets the source image as base layer. Next, at operation 1508 the process applies an interference pattern as top layer above source image. Next, at operation 1510 the process selects all black pixels then uses this selection to invert the source image. The resulting image should be heavily if not completely scrambled and concealed. Next, at operation 1512 the process, if applicable, applies a second interference pattern or image (such as a visible logo, seal, etc. that when used to invert the resulting image from previous step results in a visible image with varying density—for example the logo is seen as darker than the rest of the background). Next, at operation 1514 the process flattens the image.

Figure 16:
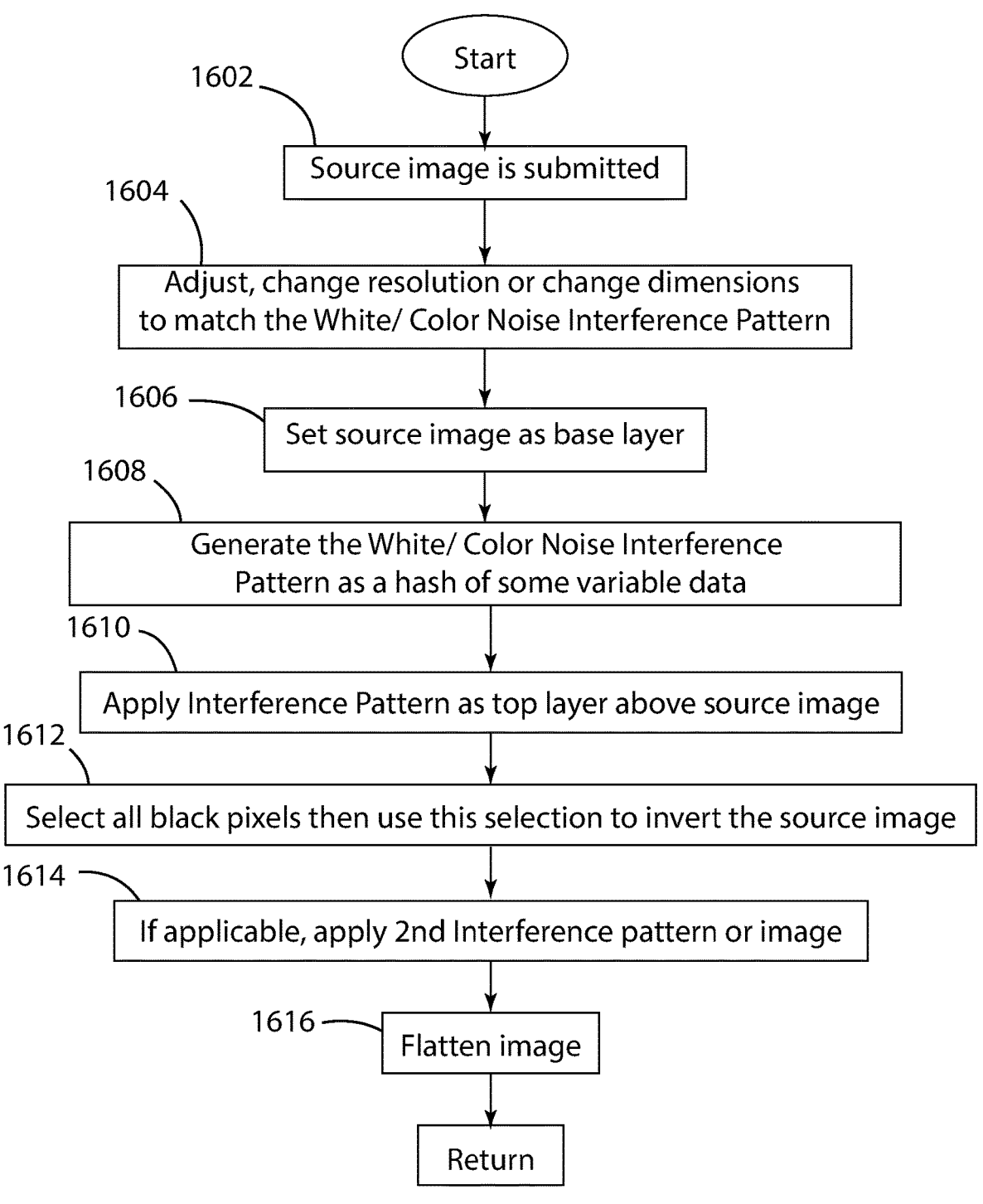
FIG. 16 illustrates an exemplary variable image-based encryption process according to one approach of the present embodiments.

FIG. 16 illustrates an exemplary variable image-based encryption process according to one approach of the present embodiments. At operation 1602 a source image is submitted. Next at operation 1604, the process adjusts, changes resolution or changes dimensions of the source/input image to match the White/Color Noise Interference Pattern (preferably having about 50% overall density so as to appear the same to the naked eye when inverted). Next, at operation 1606 the process sets the source image as base layer. Next, at operation 1608 the process generates the White/Color Noise Interference Pattern as a hash of some variable data. This can be anything from a name, date, logo, s/n, blockchain code, etc. or any combination of data. For example, one application can generate the minted image while it is being minted, with the blockchain code of the transaction, potentially the platform ID and/or username used to generate a hash that is converted into a 50% density white/color noise pattern. Another application can be to allow a user to set a password, for example, which is used to generate the hash and then the pattern, thus requiring the same password to decode the image. Next, at operation 1610 the process applies an interference pattern as top layer above source image. Next, at operation 1612 the process selects all black pixels then uses this selection to invert the source image. The resulting image should be heavily if not completely scrambled and concealed. Next, at operation 1614 the process, if applicable, applies a second interference pattern or image (such as a visible logo, seal, etc. that when used to invert the resulting image from previous step results in a visible image with varying density—for example the logo is seen as darker than the rest of the background). Next, at operation 1616 the process flattens the image.

Figure 17:
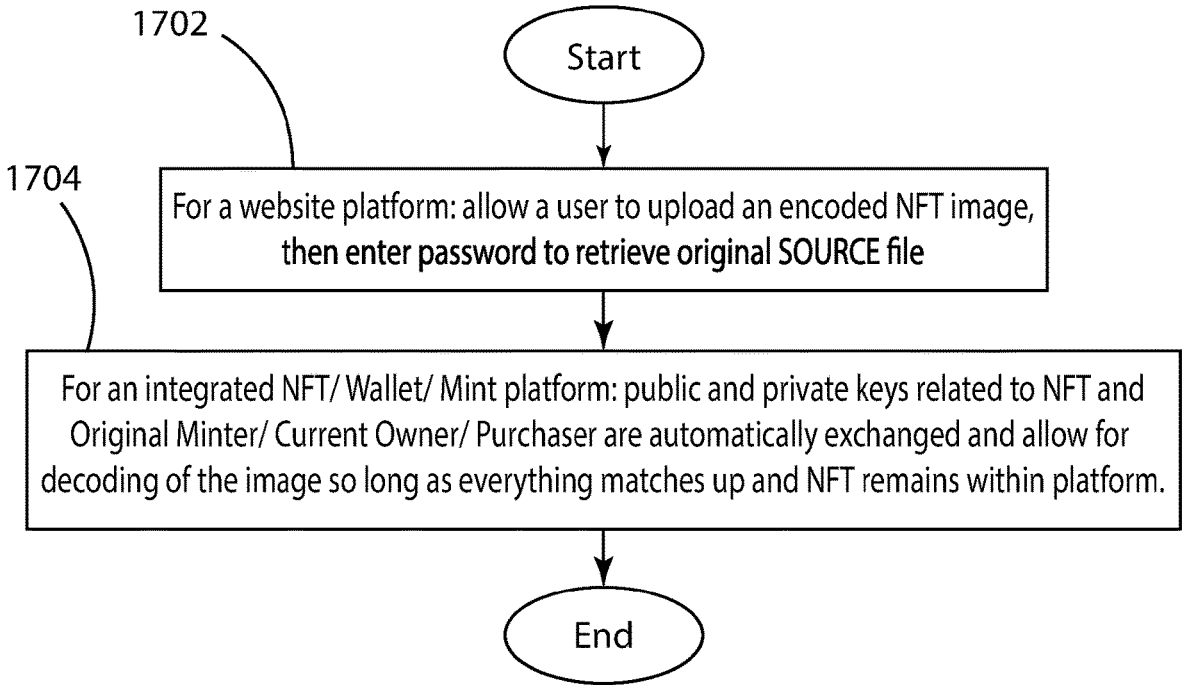
FIG. 17 illustrates an exemplary decoding image-based encryption process.

FIG. 17 illustrates an exemplary decoding image-based encryption process. At operation 1702, for a website platform: the process allows a user to upload an encoded NFT image, then enter password to retrieve original SOURCE file. Next, at operation 1704, for an integrated NFT/Wallet/ Mint platform: public and private keys related to NFT and Original Minter/Current Owner/Purchaser are automatically exchanged and allow for decoding of the image so long as everything matches up and the NFT remains within platform.

Figure 18:
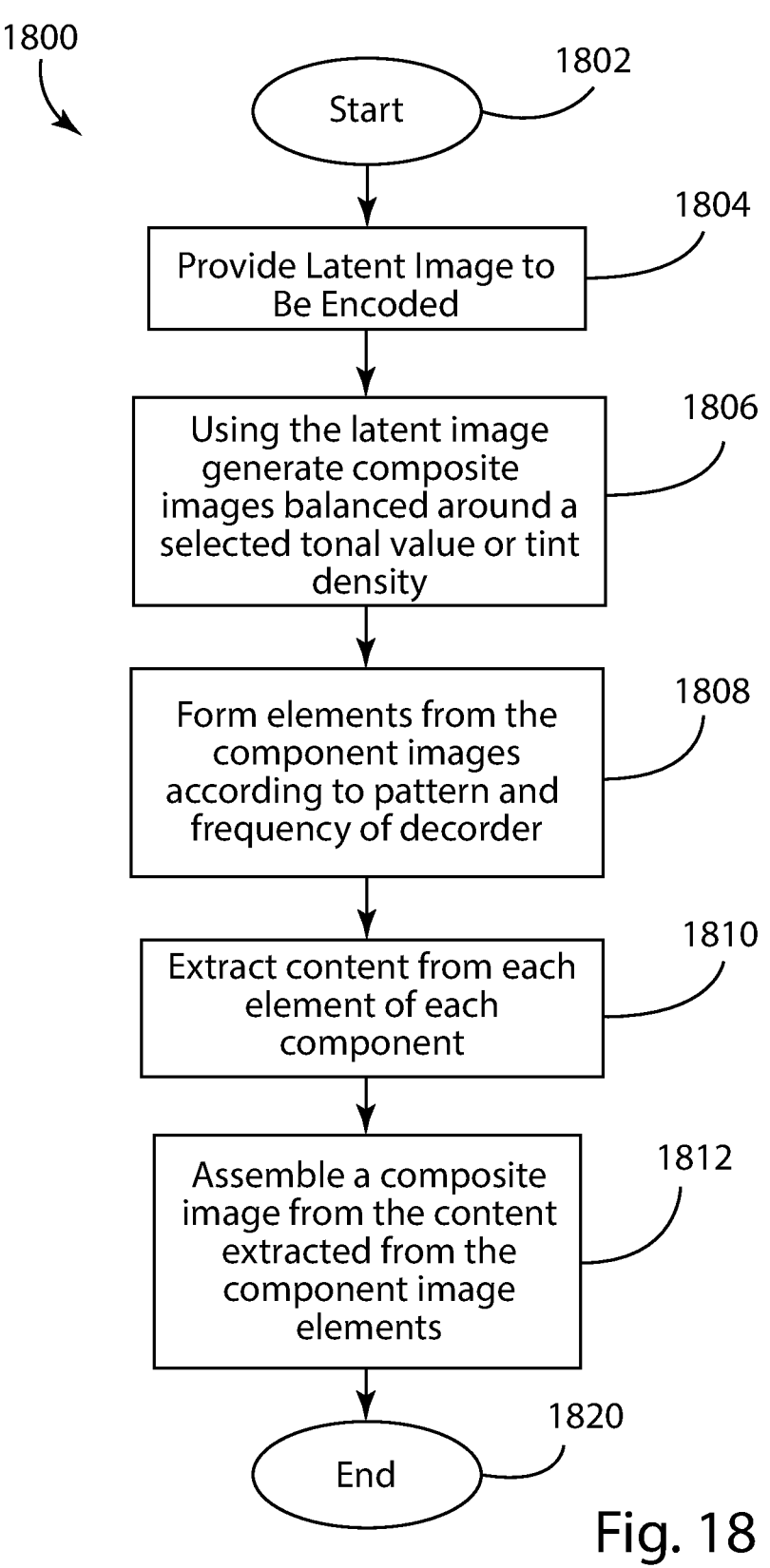
FIG. 18 illustrates is a flow diagram of a method of producing a composite image incorporating a latent image according to one approach of the present embodiments.

FIG. 18 illustrates a generalized method 1800 of producing a composite digital/screen image according to some of the present embodiments. The method 1800 begins at step 1802 and at step 1804 a latent image is provided. Using the latent image, two or more component images are created at step 1806. These component images are balanced around a selected tonal value or tint density. At 1808, the image components are used to produce a plurality of image elements to be used to form a composite image of the latent image and the visible image. These composite image elements are formed and positioned according to a pattern and frequency of the features of a decoder.

At 1810, content from each element of each of the component images is extracted. In embodiments where the component images are divided into non-overlapping elements, the action of extracting content may include subdividing each element of each component image into a predetermined number of sub-elements. The image content from the sub-elements is then extracted. The sub-elements from which content is extracted may be the inverse of the number of component images or a multiple thereof. Thus, if two component images are used, then half of the sub-elements are extracted from each element.

In embodiments where the component images are used to produce overlapping elements, the content of each element may be extracted. As previously described, a zoom factor may be applied to the extracted elements to produce sub-elements that can be used to form the composite image.

At 1812, the extracted content from the component images is used to form a composite image. This may be accomplished by placing sub-elements from each of the components into positions corresponding to the positions in the component images from which the content of the sub-elements was extracted. The method ends at 1814.

Any or all of the steps provided in present methods and any variations may be implemented using any suitable data processor or combination of data processors and may be embodied in software stored on any data processor or in any form of non-transitory computer-readable medium.

It will be understood that there are a variety of ways in which balanced image components may be constructed. In various embodiments, balanced component image portions may be created by inverting the portions of one component image to form the portions of the second component. If this approach is used, the component images may be balanced around 50% density, and the composite image will appear to the naked eye as a 50% tint. When printed or otherwise displayed, the elements of the composite image may be printed next to each other and the eye will average them out to (60%+40%)/2=50%. Another example for generating the composite image includes digitally encoding a darkened and brightened version of the color latent image. One component can be darkened by using the intensity/color curve designed for darkening, and the other component can be brightened in each location by the same amount as the first component was darkened. An alternative technique for blending colors into the composite image include transforming a color image into a color space that separates the image into intensity and color components, such as Lab, Yuv, or HSi color space, and applying intensity/color curves as mentioned above in these color spaces. Other color spaces may be used.

In some embodiments of the invention, a tint based composite image may be integrated or embedded into a visible image, such as any visible art. The composite image (s) may be hidden to the naked eye within the visible image, but rendered not hidden when a decoder is placed on the printed visible image or composite image. All of the effects associated with the composite image (i.e. the appearance of floating, alternation of component image viewability, etc.) may be retained.

One approach to this is to apply a halftone screening technique as discussed above that uses the composite images as a screen file to halftone the visible image. This technique may modify the elements of the composite image by adjusting the size of the element to mimic the densities of the pieces of the visible image at the same positions. In this method, the composite image has no more than two intensity levels in each of its color separations. The corresponding color separations of the composite image are used as screens for the visible image. If the color components of the composite image are not bilevel, they can be preprocessed to meet this requirement.

Figure 19:
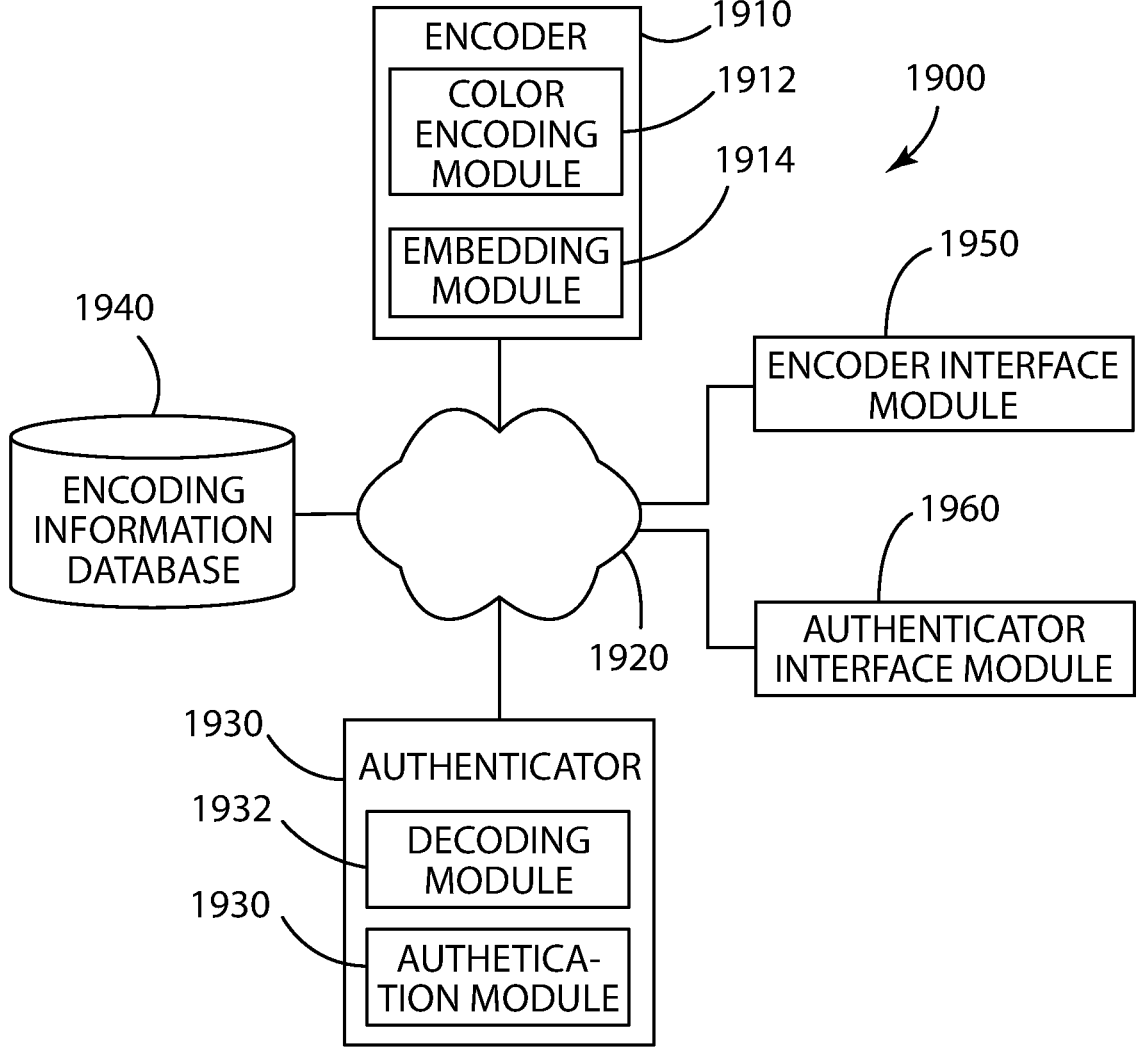
FIG. 19 illustrates a system for encoding and decoding images such that a composite image encoded with latent images two or more color components are simultaneously displayed according to one approach of the present embodiments.

FIG. 19 illustrates an exemplary digital decoding system 1900 for authenticating an encoded image affixed to an article. An encoder device 1910 is provided to include an encoder module 1912 and an embedding module 1914 that communicate with an encoding information database 1940 via a network 1920. The encoder module 1912 and the embedding module 1914 are configured to perform encoding and embedding operations, respectively. The color encoding module 1912 also may be programmed to generate an encoded image to be affixed to the article, based on encoding parameters, the visible image, and the latent image. An encoder interface module 1950 is provided to serve as an interface between a user or document processing module (not shown) and the encoder device 1910. The color encoding module 1912 may be configured to store the encoding parameters, the visible image, and the latent image in the encoding information database 1940 for subsequent use in authenticating the digitally encoded image.

The color encoding module 1912 also may store the encoded image in the database 1940 and/or return the encoded image to the encoder interface module 1950. The color encoding module 1912 further may provide the latent image to the embedding module 1914, which is adapted to embed the latent image into the visible image. The encoded image with the embedded latent image may be returned to the encoder interface module 1950.

The software decoder or authenticator 1930 may include a decoding module 1932 and an authentication module 1934 that may be in communication with the encoding information database 440. The decoding module 1932 is adapted to retrieve the encoding parameters and/or the encoded image from the encoding information database 1940. The decoding module 1932 decodes the digitally encoded image using the encoding parameters. The decoding module 1932 also may be adapted to receive the encoded image to be authenticated and extract the latent image. The latent image may be obtained from an authenticator interface 460 that is adapted as an interface between an authentication requestor and the authenticator 1930. After decoding the encoded image, the decoding module 1932 may return the decoded image to the authenticator interface and/or forward the decoded image to the authentication module 1934. The authentication module 1934 is adapted to extract latent image from the decoded image for comparison to authentication criteria, which may be derived from multitude of image features, such as shape descriptors, histograms, co-occurrence matrices, frequency descriptors, moments, color features etc. The authentication module 1934 may further be adapted to determine an authentication result and return the result to the authenticator interface. The authentication module 1934 may include OCR software or bar-code interpretation software to extract information from the article. One of ordinary skill will understand that the color encoding module 1912, the embedding module 1914, the decoding module 1932, the authentication module 1934, the encoding information database 1940, the encoder interface module 1950 and the authenticator interface module 1960 may be distributed among one or more data processors. All of these elements, for example, may be provided on a single user data processor. Alternatively, the various components of the digital decoding system 1900 may be distributed among a plurality of data processors in selective communication via the network 1920.

Additionally, software-based decoders enable encoding of composite images using multiple color separations and geometrically complicated element patterns. Some lens element patterns and shapes may be difficult or impractical to physically manufacture as optical lenses. These difficulties, however, do not apply to the techniques used to create the images of the present invention and, moreover, do not apply to software-based decoders. The software-based decoder may be designed with flexibility to enable device users to adjust the decoding parameters. The methods described herein can make use of a "software lens" having lens elements that have a variable frequency, complex and/or irregular shapes (including but not limited to ellipses, crosses, triangles, randomly shaped closed curves or polygons), variable dimensions, or a combination of any of the preceding characteristics. The methods of the invention can be applied based on the specified lens configuration, even if this configuration cannot be physically manufactured. The methods of creating composite images from component images as described herein are based on the innovative use of geometric transformations, such as mapping, scaling, flipping etc, and do not require a physical lens to be created for this purpose. Providing a software-based lens configuration, or specification, allows a user to implement desired software lenses. Some or all of the characteristics of the software lens could then be used by a software decoder to decode the encoded composite image to produce decoded versions of the component images used to create the composite image.

The decoder also may include a rendering device that is configured decode the latent images. The rendering device may include a lens configured in any shape and having lens elements arranged in any pattern. For example, the lens may include lens elements arranged in a symmetrical pattern, an asymmetrical pattern, or a combination of both. The lens may further include lens elements that are arranged in a regular pattern or an irregular pattern.

According to one example, the rendering device may include a lenticular lens having lenticules arranged in a straight line pattern, a wavy line pattern, a zig-zag pattern, a concentric ring pattern, a cross-line pattern, an aligned dot pattern, an offset dot pattern, a grad frequency pattern, a target pattern, a herring pattern or any other pattern. Alternatively, the rendering device may include lenses, such as a fly's eye lens, having a multidimensional pattern of lens elements. The multidimensional pattern may include a straight line pattern, a square pattern, a shifted square pattern, a honey-comb pattern, a wavy line pattern, a zigzag pattern, a concentric ring pattern, a cross-line pattern, an aligned dot pattern, an offset dot pattern, a grad frequency pattern, a target pattern, a herring pattern or any other pattern.

Encoding Animations into Images

According to one example, a plurality of latent images may be encoded into a visible image. The plurality of latent images increases a level of security and integrates multimedia features into the authentication process. The plurality of latent images may be decoded and displayed sequentially to produce an animation that shows differences between the sequentially displayed latent images. According to one example, the animation may be created using encoding techniques that combine multiple component images into an encoded composite image, as described in U.S. Pat. No. 8,682,025, which is incorporated herein by reference. If more than two component images are used, each component image may correspond to an animation frame. The plurality of animation frames can be embedded in a composite image. According to one example, the user may change an angle of view through the decoding lens to decode the animation frames in a desired sequence to produce the animation embedded in the encoded image.

According to another example, the animation frames may be encoded into multiple halftone screens within one or several color separations of a visible artwork. For example, a first frame may be encoded into a halftone screen that runs at 15 degrees, a second frame may be encoded into a halftone screen that runs at 45 degrees, a third frame may be encoded into a halftone screen that runs at 75 degrees, and so on. To compose the animation, a digital decoding device or system such as those described in Digital Decoding U.S. Pat. Nos. 7,512,249, 7,630,513, 7,561,308, and 7,558,401 may be used to decode and display the animation frames to the user in an appropriate sequence. An alternative decoding method may include an optical lens that rotates to reveal the decoded image in the sequence determined by the direction of rotation. One of ordinary skill in the art will readily appreciate that encoding techniques other than halftone screen encoding techniques may be employed.

According to yet another example, a single halftone screen may include a pattern having an object encoded at different locations. The different locations may be decoded in a particular sequence to reveal animations embedded within the single halftone screen. For example, the different pattern locations may be decoded in a particular sequence to depict a moving object. For example, the object may be configured to move across a space occupied by the animation.

According to another example, a single halftone screen may include a pattern having two or more objects encoded at different locations. The different locations may be decoded in a particular sequence to reveal animations embedded within the single halftone screen. For example, the different pattern locations may be decoded in a particular sequence to depict the two or more objects moving. For example, the two or more object may be depicted as moving across the animation. According to one example, the different locations may be decoded simultaneously to depict the two or more objects moving at a same time. One of ordinary skill in the art will readily appreciate that encoding techniques other than halftone screen encoding techniques may be employed.

According to yet another example, different locations within a single halftone screen may be decoded and the decoding process may be repeated over a plurality of animation frames. Subsequently, a same relative location may be displayed for the plurality of animation frames. For example, the plurality of animation frames may be taken from different relative locations in multiple halftone screens and may be programmed to be displayed in a same location in the decoded animation.

In addition to halftone screen encoding techniques, hidden images may be encoded using any pattern modulations techniques. For two dimensional patterns, such as dot screens, diamonds, etc., two hidden images may be encoded in each instance of a pattern. Furthermore, multiple patterns may be combined together to create a sequence having multiple animation frames. The combined patterns may differ by angle, frequency, or some other parameter that describes the pattern. Examples of pattern modulation techniques include shifting pattern elements, rotating pattern elements, changing a pattern frequency, scrambling, and changing a density of pattern elements, among other pattern modulation techniques. A common element for pattern modulation includes controlling pattern parameters to match a pattern parameter of the decoding optical lens. For example, if a lenticular optical decoder is used then the pattern parameters may match such that an angle of the dot pattern corresponds to an angle of the lenticular lens elements and a frequency of the dot pattern is a multiple of the lenticular frequency. According to one example, the pattern parameters or methods used for pattern modulation may be different for each frame. For example, each frame may be encoded using a different frequency. Furthermore, the pattern may display as a tint, without having noticeable design elements inside it.

According to one example, an animation encoded into a visible image may depict a moving object. For example, each frame in the animation may show the object at a different location. When the frames are sequentially decoded using a digital decoding method, for example, the sequence may provide an illusion that the object is moving. According to one example, an animation speed may be adjusted by changing a rate with which the decoded animation frames are displayed on the digital decoding device. Alternatively, an animation speed may be adjusted by varying a rotation speed of the decoding lens.

According to another example, static output images may be created from methods used to encode animations into a visible image. For example, an animation may be encoded into a static output image that is printed in large volume such as a preprinted background for passports or birth certificates. Furthermore, the animation may be encoded into a static output image such as artwork provided on a packaging design.

According to yet another example, variable output images may be created from methods used to encode animations into a visible image. For example, hidden animation frames may be rendered from variable information such as a date of birth, a name, a serial number, a date of production/issuance, an expiration date, a lot number, a batch number, or a serial number, or the like. An animation may also be provided to sequentially show both a profile and a front photo of a person. The variable animation frames may be embedded inside a static image or inside a variable image, such as a photo of a document bearer.

According to yet another example, the static animation may be embedded within a variable image. For example, animation frames may include a country name, a country flag, or the like. These static animations may be embedded within a document having a bearer's photo. One of ordinary skill in the art will readily appreciate that each photo is different for each document.

According to one example, an animation may be assembled using a smart phone, a personal computer, or any other electronic device capable of executing digital decoding methods. An image may be captured using a camera, scanner, or similar image acquisition device, before the animation frames are decoded. According to one example, the electronic device may be configured to modify decoding parameters on a frame-by-frame basis to match controlling encoding parameters. For example, if the animation frames are encoded at different angles, then the decoding algorithm may determine the different angles needed to extract the modulated portions of each of the frames. The angles may not be known in advance. According to one example, the angles may be determined by analyzing the encoded image. For example, topological markers on the document may be analyzed. If the animation frames are encoded at different frequencies, for example, the decoding algorithm may employ different decoding frequencies to extract appropriate information from the animation frames. Again, the frequencies may not be known in advance and may be determined from data provided with the encoded image. According to one example, software may be employed to assemble the animation frames into an animation that is displayed in a desired sequence. According to one example, the frame assembling step is optional. For example, if live decoding is used, where the decoded image is displayed or overlaid immediately on a screen in a camera window or in a separate window, the software may be configured to change the decoding parameters in an appropriate sequence such that the frames may be automatically viewed in a desired sequence.

According to another example, hidden images and/or animations may be extracted using a transparent, semi-transparent, or partially transparent substrate having the encoded image printed or otherwise applied thereon. Steganographic effects may be created through interaction between an image displayed on a digital screen and an image printed or applied onto a substrate upon placing the substrate on a digital screen, such as a smartphone screen, PDA screen, music/video player screen, ATM screen, a computer screen, or the like. The software may display an unmodulated pattern on the screen and the overlap between the modulated and unmodulated patterns may cause the modulated segments to stand out and become noticeable to the user.

If multiple patterns are employed having different modulations of pattern parameters, then the software may display unmodulated versions of these patterns in a sequence used to decode sequential frames and create animation effects. According to one example, similar but not identical patterns may be used to perform authentication. For example, unmodulated line screens may be used to extract hidden images from both modulated two-dimensional halftone screens, such as dot screens or diamond screens, and modulated halftone line screens. Furthermore, controlling pattern parameters or methods used for pattern modulation may differ for each frame. For example, each frame may be encoded using a different frequency. One advantage provided by this method over known digital decoding techniques is that it uses less resources and simpler software programs. For example, the software is configured to display an appropriate pattern on the screen underneath the encoded transparency. The human eye will decode the encoded image on the transparency based on the appropriate pattern displayed on the screen.

One example of this approach employs dot screens to produce halftone images for different color separations of a document. The document may include a stamp or a currency note, for example. By modulating the dot screens, such as by shifting the dot screens at locations corresponding to the hidden images, two hidden images may be added to each color separation. The document may be printed on a transparent, semi-transparent, or partially transparent substrate, and may be placed on a digital screen to perform authentication. If the rotating line screen is displayed at a same frequency as the modulated dot screens, then the hidden images will be revealed sequentially one after another as the decoding line screen rotates. For example, a first frame may be encoded at 15 degrees, a second frame may be encoded at 45 degrees, a third frame may be encoded at 75 degrees, and so on. According to one example, multiple rotating line screens may be employed to simultaneously reveal different locations within the visible artwork.

According to another example, a position of the decoding screen and the encoded image may be reversed. According to one example, the decoder may include an unmodulated pattern while the encoded image may include a modulated pattern. The document may be printed on a transparent, semi-transparent, or partially transparent substrate and may be used as a decoder, while the encoded image may be shown on the device screen. In one example, the digital image may be rotated on the device screen to create an animation. Alternatively, a pre-assembled GIF file may be employed to perform the authentication. According to another example, a sequence of contextually different digital images may be displayed to create different animation frames by overlapping the different digital images with the document placed on the device screen. According to yet another example, a video may be displayed where all or some of the animation frames may contain encoded information. Accordingly, document security may be enhanced by using custom screening frequencies and custom angles, which are not common in commercial printing. One of ordinary skill in the art will readily appreciate that these two approaches may be combined. For example, some of the animation frames or hidden images may be created by modulating the document pattern, while others may be created by modulating the pattern displayed on the digital screen.

If both patterns are modulated at different locations, then two sets of hidden elements may be created simultaneously by overlapping the document and the screen patterns. The document and the screen patterns may be designed to complement each other in order to create new hidden images that cannot be extracted in their totality from either the printed document or from the digital images shown on the digital screen.

In addition to authenticating images presented on the transparent substrate, the digital screen may be used to authenticate electronic documents displayed on transparent screens, such as transparent OLED displays. According to one example, the electronic document may contain a modulated pattern or a reference pattern. The electronic document may be authenticated by placing the transparent screen against the digital screen used for the authentication. Since the document is provided in an electronic format, the document also may include a video or GIF file. The electronic format opens additional avenues for combining content from the electronic document presented on a transparent screen and content presented on the digital screen, which is used for document authentication. For example, a sequence of images may be displayed in temporal registration both on the transparent screen and the digital screen in order to render a desired authentication animation. One of ordinary skill in the art will readily appreciate that other techniques may be used to combine content from the transparent screen and content from the digital screen.

According to other examples, composite image methods, such as those described in U.S. Pat. No. 8,682,025 may be used to authenticate electronic documents in accordance with this disclosure. Furthermore, color encoded images methods may be used to authenticate electronic documents in accordance with this disclosure. Different color patterns may be used on both the digital screen and printed document to create and reveal new colors. According to another example, component images may be reduced or enlarged by different magnitudes to create composite images with motion effects during decoding that vary based on viewing angles. According to yet another example, color images provided on the device screen and the transparent screen may be modulated to create desired effects when placed in registration. For example, the color images may be modulated so that desired colors will add or subtract when placed in registration to reveal a hidden image, such as a full color hidden image.

The patterns displayed on the digital screen can be pre-installed on the device connected with this digital screen, or they can be delivered on demand from the authentication server. For example, the bar code, document content, or similar document serialization/recognition feature can be used to request delivery of appropriate pattern from the authentication server, and further to display the corresponding pattern on the digital screen. In one embodiment, the pattern can be requested from the smartphone, using a picture taken with the phone camera, and the appropriate steganographic effect-inducing patterns can be created and delivered by the web service in a form of a GIF file, with pattern parameters adjusted to work well with the screen of the particular phone model used to send a request.

Figure 20:
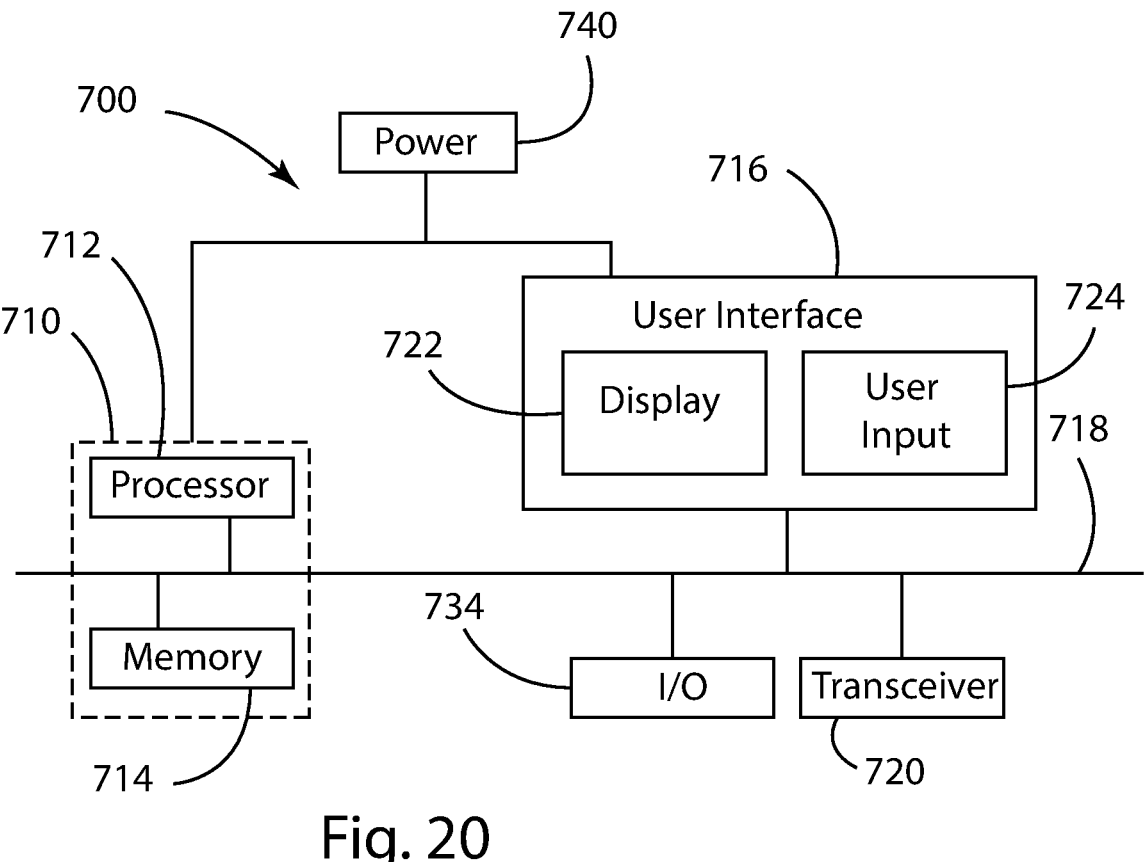
FIG. 20 illustrates an exemplary system for use in implementing methods, techniques, devices, apparatuses, systems, servers, sources and the like, in accordance with some of the present embodiments.

In a general illustration, the present invention can be realized as methods or systems in hardware, software, or a combination of hardware and software of a computing device system including a computing device network system as shown schematically in FIG. 20. The present invention can be realized in a centralized fashion in one computing device system or in a distributed fashion where different elements are spread across several computing device systems. Any kind of computer system, or other apparatus adapted for carrying out the methods described herein, is suited.

A typical combination of hardware and software may include a general purpose computer system with a computer program that, when being loaded and executed, controls the computer system such that it carries out the systems and methods described herein. The present invention may be voluntarily embedded in a computing device program product (or any computing device useable medium having computer readable program code embodied therein), which comprises all the features enabling the implementation of the methods and systems described herein and which when loaded in a computing device system is able to carry out these systems and methods. The present invention may be embedded in a computing device program product by a manufacturer or vendor of the computing device (or any computing device useable medium having computer readable program code embodied therein), which comprises all the features enabling the implementation of the methods and systems described herein and which when loaded in a computer system is able to carry out these systems and methods, and is voluntarily turned off or on by the user. The present invention may be embedded in a computer program product by a manufacturer or vendor of the computer (or any computer useable medium having computer readable program code embodied therein), which comprises all the features enabling the implementation of the methods and systems described herein and which when loaded in a computer system carries out these systems.

Computer program or computer program product in the present context means any expression, in any language, code or notation, of a set of instructions intended to cause a system having an information processing capability to perform a particular function either directly or after either or both of the following: (a) conversion to another language, code or notation, and (b) reproduction in a different material or electronic form.

Further, the processes, methods, techniques, circuitry, systems, devices, functionality, services, servers, sources and the like described herein may be utilized, implemented and/or run on many different types of devices and/or systems. Referring to FIG. 20, there is illustrated an exemplary system 700 that may be used for many such implementations, in accordance with some embodiments. One or more components of the system 700 may be used for implementing any circuitry, system, functionality, apparatus or device mentioned above or below, or parts of such circuitry, functionality, systems, apparatuses or devices, such as for example any of the above or below mentioned computing device, the systems and methods of the present invention, request processing functionality, monitoring functionality, analysis functionality, additionally evaluation functionality and/or other such circuitry, functionality and/or devices. However, the use of the system 700 or any portion thereof is certainly not required.

By way of example, the system 700 may comprise a controller or processor module, memory 714, and one or more communication links, paths, buses or the like 718. Some embodiments may include a user interface 716, and/or a power source or supply 740. The controller 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 712 can be part of control circuitry and/or a control system 710, which may be implemented through one or more processors with access to one or more memory 714. The user interface 716 can allow a user to interact with the system 700 and receive information through the system. In some instances, the user interface 716 includes a display 722 and/or one or more user inputs 724, such as a buttons, touch screen, track ball, keyboard, mouse, etc., which can be part of or wired or wirelessly coupled with the system 700.

Typically, the system 700 further includes one or more communication interfaces, ports, transceivers 720 and the like allowing the system 700 to communication over a communication bus, a distributed network, a local network, the Internet, communication link 718, other networks or communication channels with other devices and/or other such communications or combinations thereof. Further the transceiver 720 can be configured for wired, wireless, optical, fiber optical cable or other such communication configurations or combinations of such communications. Some embodiments include one or more input/output (I/O) ports 734 that allow one or more devices to couple with the system 700. The 1/O ports can be substantially any relevant port or combinations of ports, such as but not limited to USB, Ethernet, or other such ports.

The system 700 comprises an example of a control and/or processor-based system with the controller 712. Again, the controller 712 can be implemented through one or more processors, controllers, central processing units, logic, software and the like. Further, in some implementations the controller 712 may provide multiprocessor functionality.

The memory 714, which can be accessed by the controller 712, typically includes one or more processor readable and/or computer readable media accessed by at least the controller 712, and can include volatile and/or nonvolatile media, such as RAM, ROM, EEPROM, flash memory and/or other memory technology. Further, the memory 714 is shown as internal to the system 710; however, the memory 714 can be internal, external or a combination of internal and external memory. Similarly, some or all of the memory 714 can be internal, external or a combination of internal and external memory of the controller 712. The external memory can be substantially any relevant memory such as, but not limited to, one or more of flash memory secure digital (SD) card, universal serial bus (USB) stick or drive, other memory cards, hard drive and other such memory or combinations of such memory. The memory 714 can store code, software, executables, scripts, data, content, lists, programming, programs, log or history data, user information and the like.

Some of the present embodiments may be installed on the computing device that receives data transaction requests from the computing device from an interface. The present embodiments can be configured to process data transaction requests received through the interface. Typically, the present embodiments can be communicatively connected to a communication network (e.g., a WAN, LAN, the Internet, etc.), and has the capability of completing the data transaction requests. The present embodiments can communicationally connect with one or more remote servers that are configured to provide information useful in determining the nature of one or more data transaction requests. The present embodiments can further, in some instances, complete a data transaction request through the interface.

Further, in some applications, the remote server is implemented through and/or includes a server cluster containing multiple servers that cooperatively operate and/or communicate to provide analysis functionality. In other instances, the remote server may be implemented in part or fully on personal computer.

The present embodiments may further block access to the network access activity when the network access activity is considered an objectionable or non-compliant activity.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

While several embodiments of the present invention have been shown and described in detail, it to be understood that various changes and modifications could be made without departing from the scope of the invention.

The drawings and the foregoing descriptions are not intended to represent the only forms of assemblies in regard to the details of construction. Changes in form and in proportion of parts, as well as the substitution of equivalents, are contemplated as circumstances may suggest or render expedient. Throughout this specification and the drawings and figures associated with this specification, numerical labels of previously shown or discussed features may be reused in another drawing figure to indicate similar features.

I claim:

1. A computer-implemented method of concealing and revealing at least one hidden image into a visible image, the method comprising:

generating, via a processor, a first image that is visible on a computing device screen;

generating, via a processor, at least one second image, the at least one second image being in an invisible or nearly invisible state to the human eye in a neutral state and visible in a user activated state; and wherein the activated state of the computing device is achieved when the computing device screen is zoomed in or out, pointer scrolled in a predetermined way, or when the first image has its window size changed.

2. The method of claim 1, wherein the invisible or nearly invisible state is achieved by a providing a concealing interference pattern using at least one of vertical, horizontal, cross-lenticular, hexagonal and shape-based pattern imposed over the at least one second image, wherein interlacing both positive and negative versions of the at least one second image essentially cancels itself out and being concealed as a generally smooth tint.

3. The method of claim 1, wherein the invisible or nearly invisible state is achieved by an encoded image displayed on a screen that contains a hidden latent image, wherein the hidden latent image is revealed by overlaying an optical decoding filter on the screen.

4. The method of claim 3, wherein the optical decoding filter is pattern-based or color-filter based.

5. A computer-implemented method of concealing and revealing at least one image, the method comprising, in order:

submitting a source image;

adjusting, changing the source/input image resolution or changing dimensions to match the White/Color Noise Interference Pattern having about 50% overall density so as to appear the same to the naked eye when inverted;

setting the source image as base layer;

applying an interference pattern as top layer above the source image;

selecting all black pixels then using this selection to invert the source image, wherein the pixels are at least one of linear, rectangular, square, hexagonal, or any other repeating shape-based pattern array and wherein the pixels are LED RGB sub-pixels that make up the construction of a display screen;

applying a second interference pattern or image; and flattening the image.

* * * * *